United States Patent
Proia

(10) Patent No.: US 9,162,706 B2
(45) Date of Patent: Oct. 20, 2015

(54) SELF-TRACKING SYSTEM FOR THE REAR AXLES OF TRUCKS

(76) Inventor: Cataldo Proia, Rome, NY (US)

(*) Notice: Subject to any disclaimer, the term of this patent is extended or adjusted under 35 U.S.C. 154(b) by 712 days.

(21) Appl. No.: 13/070,140

(22) Filed: Mar. 23, 2011

(65) Prior Publication Data

US 2011/0248115 A1 Oct. 13, 2011

Related U.S. Application Data

(60) Provisional application No. 61/316,429, filed on Mar. 23, 2010.

(51) Int. Cl.
*B62D 17/00* (2006.01)
*B62D 13/06* (2006.01)
*B60G 17/016* (2006.01)
*B62D 7/14* (2006.01)

(52) U.S. Cl.
CPC .............. *B62D 13/06* (2013.01); *B60G 17/016* (2013.01); *B62D 7/144* (2013.01); *B60G 2200/44* (2013.01); *B60G 2200/464* (2013.01); *Y10T 29/49716* (2015.01)

(58) Field of Classification Search
CPC ........ B62D 17/00; B60G 7/001; B60G 7/003; B60G 7/005; B60G 17/015; B60G 17/016; B60G 17/0162; B60G 2200/144; B60G 2200/464; B60G 2204/143; B60G 2204/62
USPC .............. 280/5.521, 86.751, 86.757, 86.754, 280/124.134, 124.135, 124.138; 701/41
See application file for complete search history.

(56) References Cited

U.S. PATENT DOCUMENTS

| | | | | |
|---|---|---|---|---|
| 3,285,622 A | * | 11/1966 | Castoe | 280/86.757 |
| 3,516,625 A | | 6/1970 | Houser et al. | |
| 4,236,728 A | * | 12/1980 | Policy et al. | 280/5.521 |
| 4,327,927 A | * | 5/1982 | Tanaka et al. | 280/124.137 |
| 5,220,972 A | | 6/1993 | Proia | |
| 5,242,131 A | | 9/1993 | Watts | |
| 5,364,113 A | * | 11/1994 | Goertzen | 280/81.6 |
| 5,479,999 A | | 1/1996 | Proia | |
| 5,481,458 A | * | 1/1996 | Harara et al. | 701/37 |
| 5,700,025 A | * | 12/1997 | Lee | 280/86.751 |
| 6,007,078 A | * | 12/1999 | Gottschalk et al. | 280/86.751 |
| 6,029,931 A | | 2/2000 | Encarthe et al. | |
| 6,105,981 A | * | 8/2000 | Buelt et al. | 280/86.751 |
| 6,293,570 B1 | | 9/2001 | Gottschalk et al. | |
| 6,880,839 B2 | | 4/2005 | Keeler et al. | |
| 7,392,996 B2 | | 7/2008 | Mattocks | |

(Continued)

*Primary Examiner* — James English
(74) *Attorney, Agent, or Firm* — Frederick J. M. Price; George R. McGuire; Bond Schoeneck & King, PLLC

(57) ABSTRACT

A steering system for a vehicle, the vehicle defining a vertical direction, a forward direction and a reverse direction, the steering system including: an axle assembly defining a central axis comprising an axle and a bearing sleeve circumferentially surrounding the axle; a wheel assembly; and axle-to-wheel connection hardware set defining a caster axis with the caster angle being the angle between the caster axis and the vertical direction; and a caster angle adjustment assembly; wherein: the axle-to-wheel connection hardware mechanically connects the axle assembly to the wheel assembly so that the wheel assembly can rotate about the caster axis with respect to the axle assembly; and the caster angle adjustment assembly is structured, connected and/or located to actuate at least the axle-to-wheel connection hardware set to change the caster angle between at least a first angle and a second angle during operation of the vehicle.

1 Claim, 27 Drawing Sheets

(56) References Cited

U.S. PATENT DOCUMENTS

| | | | |
|---|---|---|---|
| 7,980,576 B2 * | 7/2011 | Inoue et al. | 280/124.121 |
| 8,419,022 B2 * | 4/2013 | Blondelet et al. | 280/5.521 |
| 2001/0015536 A1 * | 8/2001 | McIntyre | 280/86.751 |
| 2010/0078517 A1 | 4/2010 | Coles et al. | |
| 2013/0049328 A1 * | 2/2013 | Qattan et al. | 280/426 |

* cited by examiner

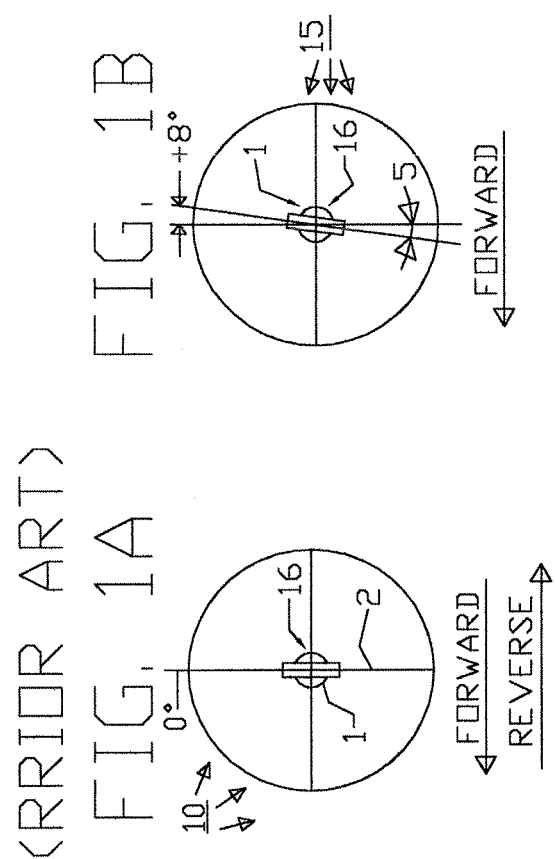

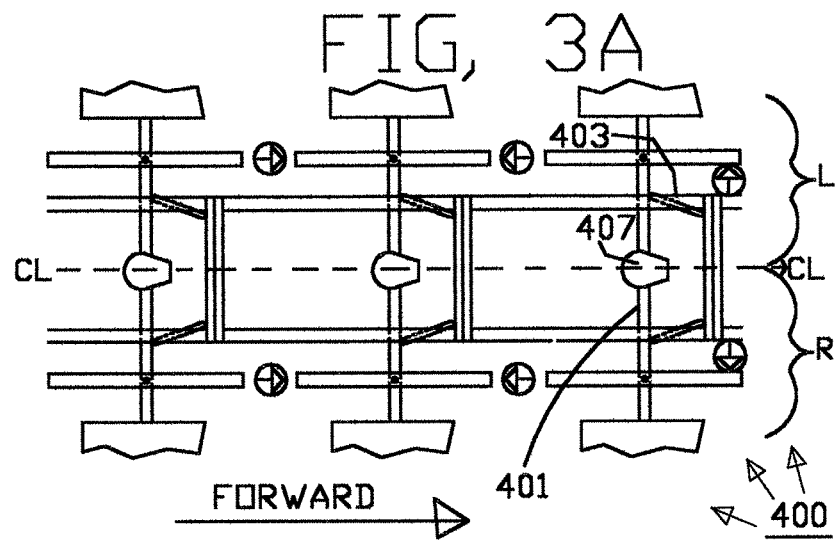
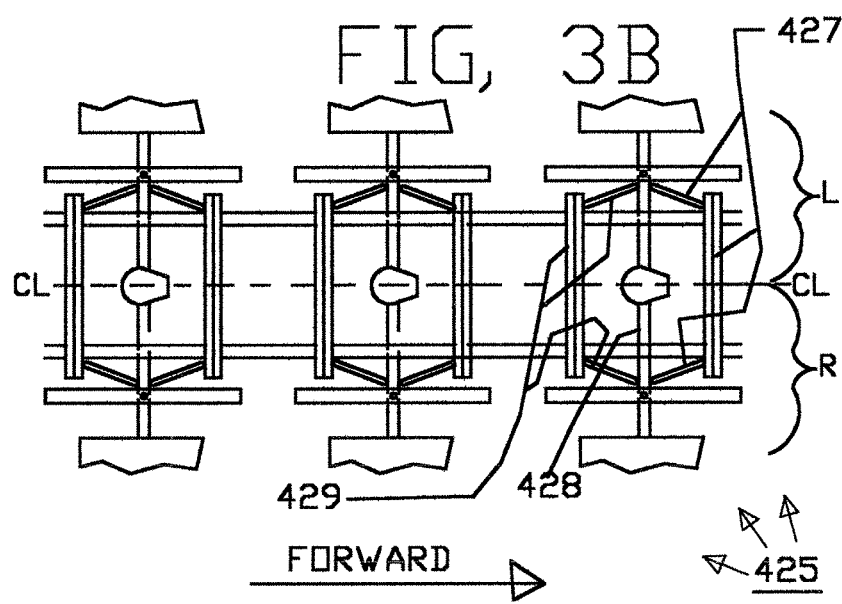

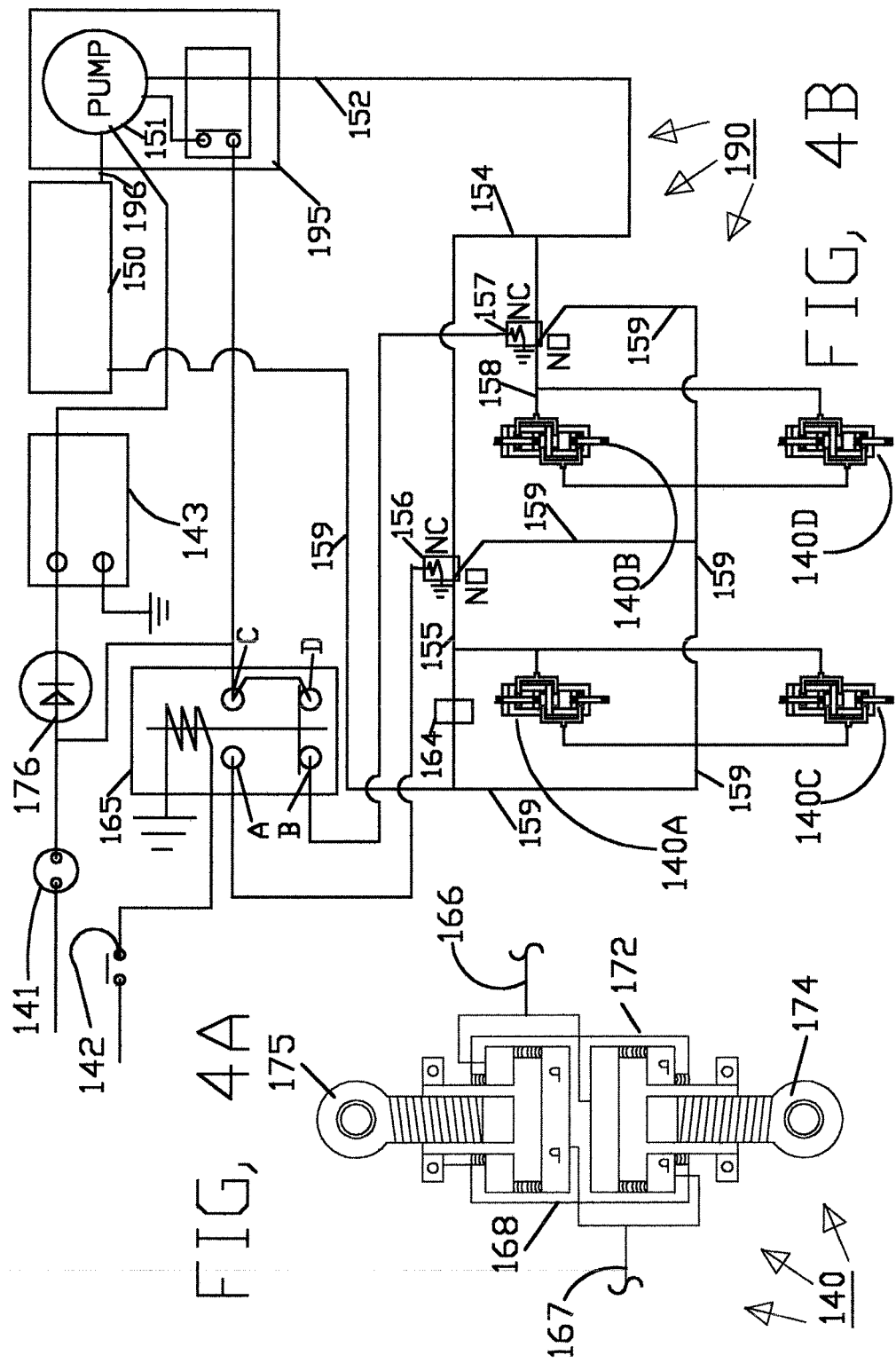

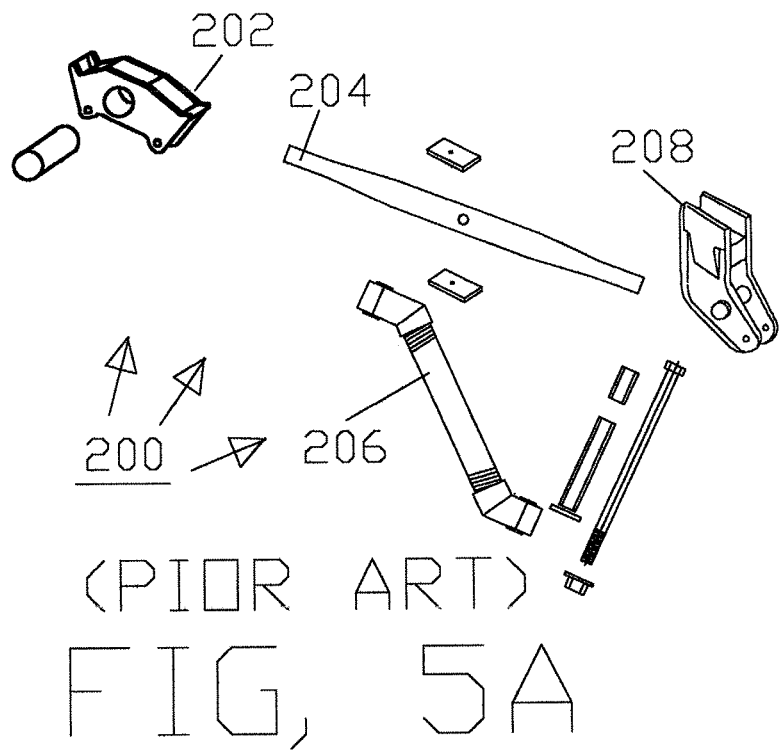
(PIOR ART)
FIG. 5A
FIG. 5B
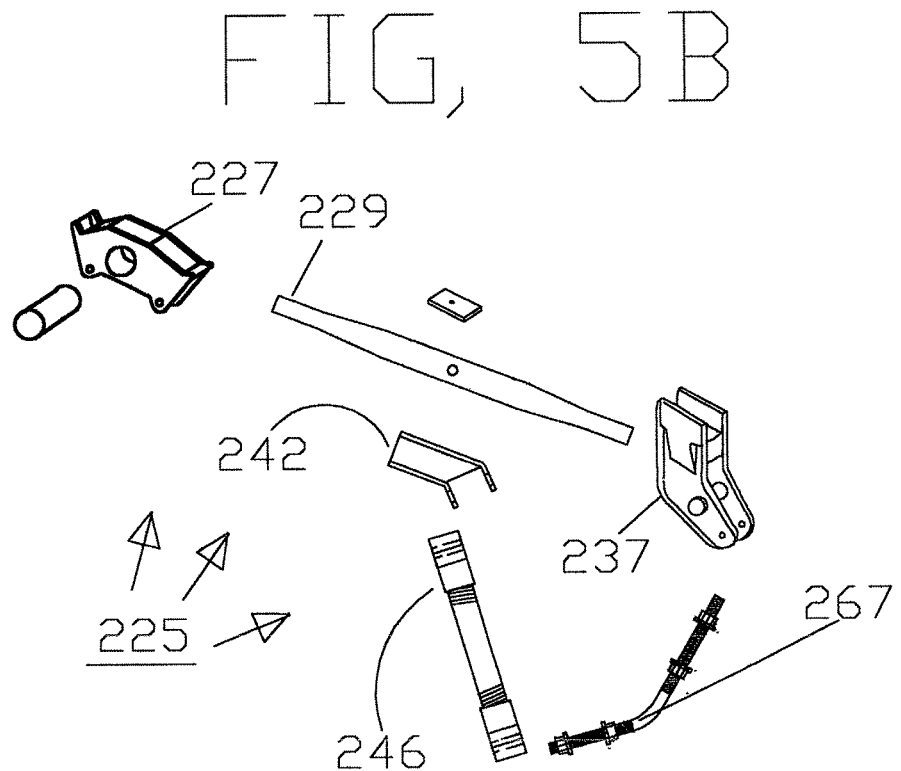

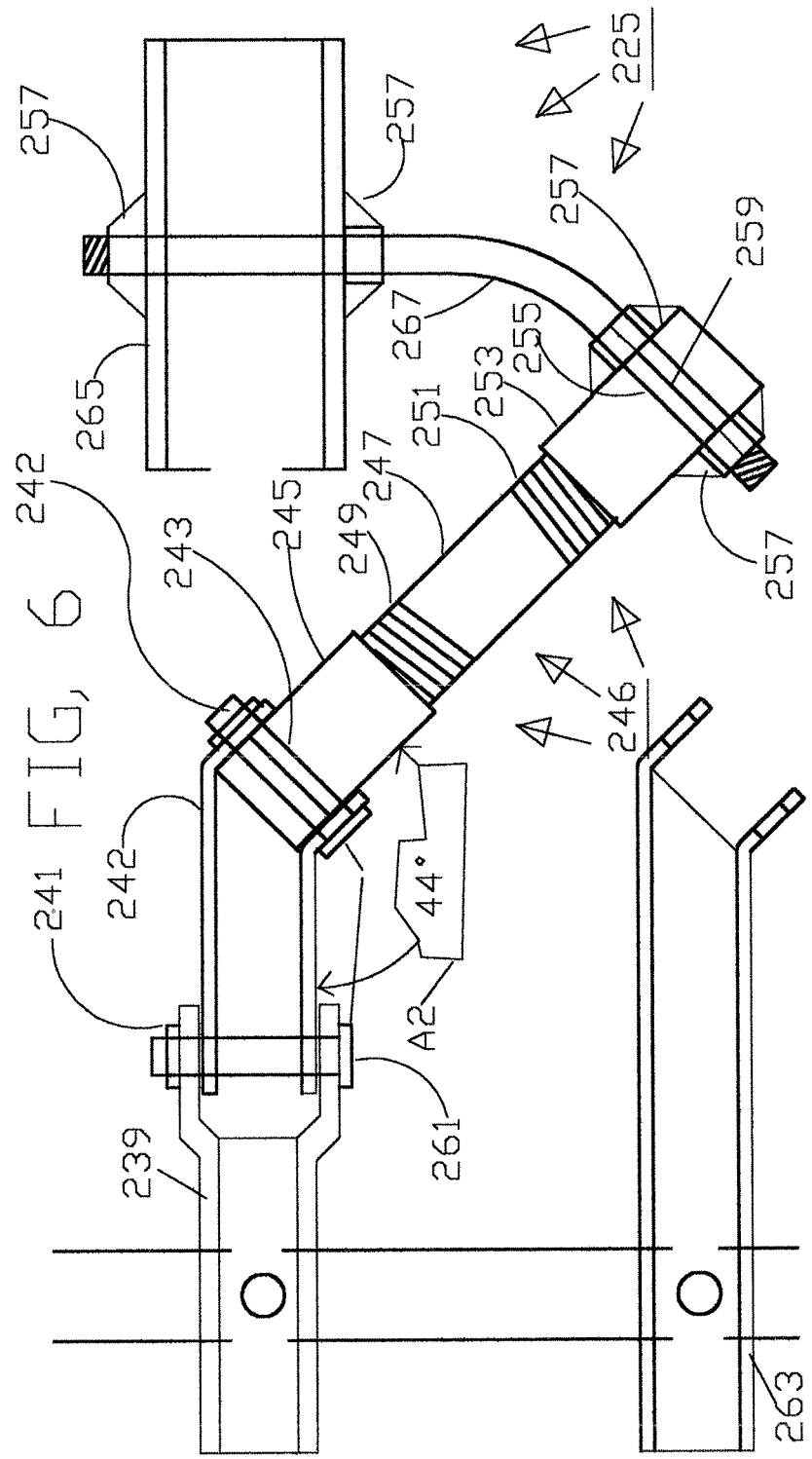

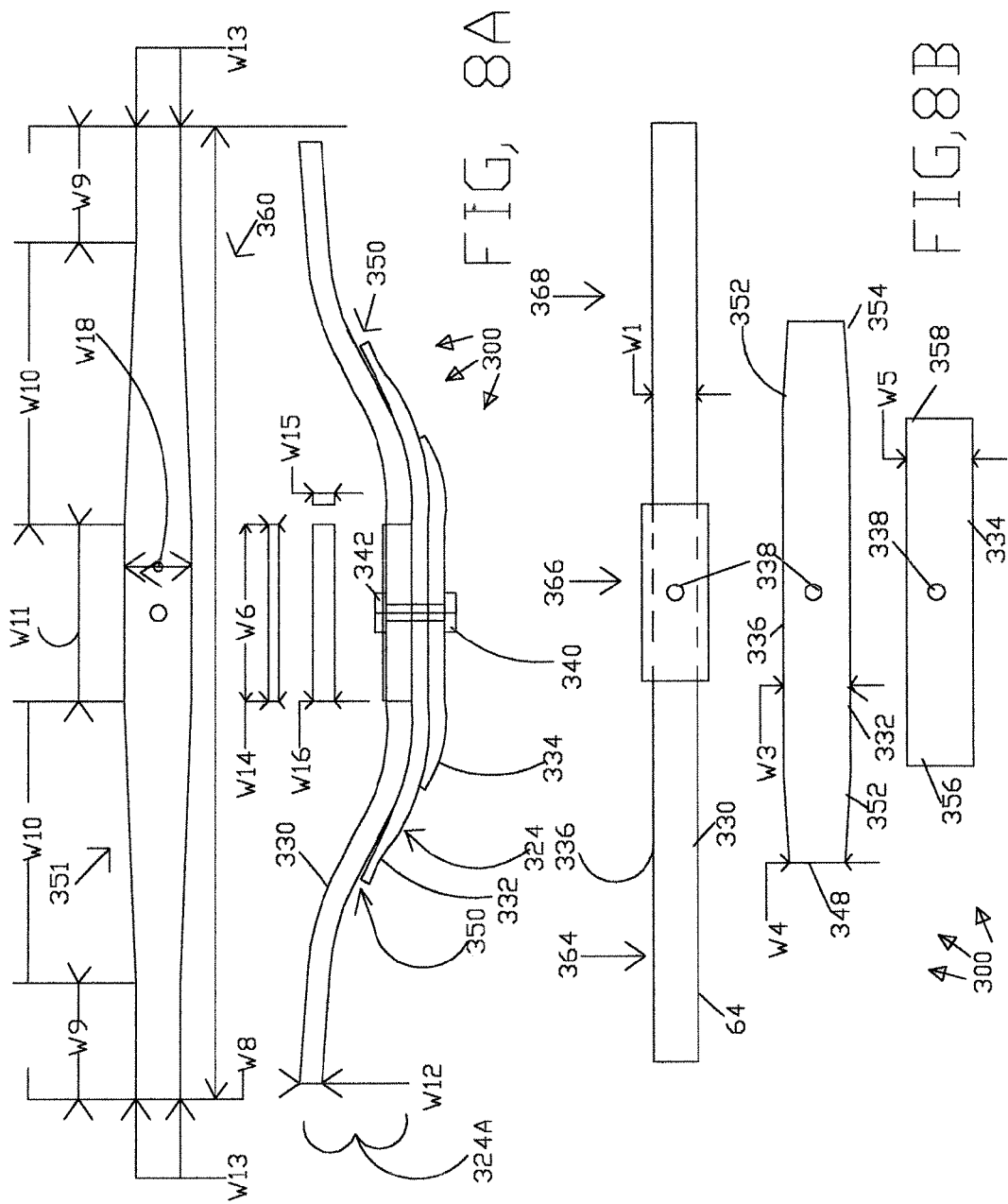

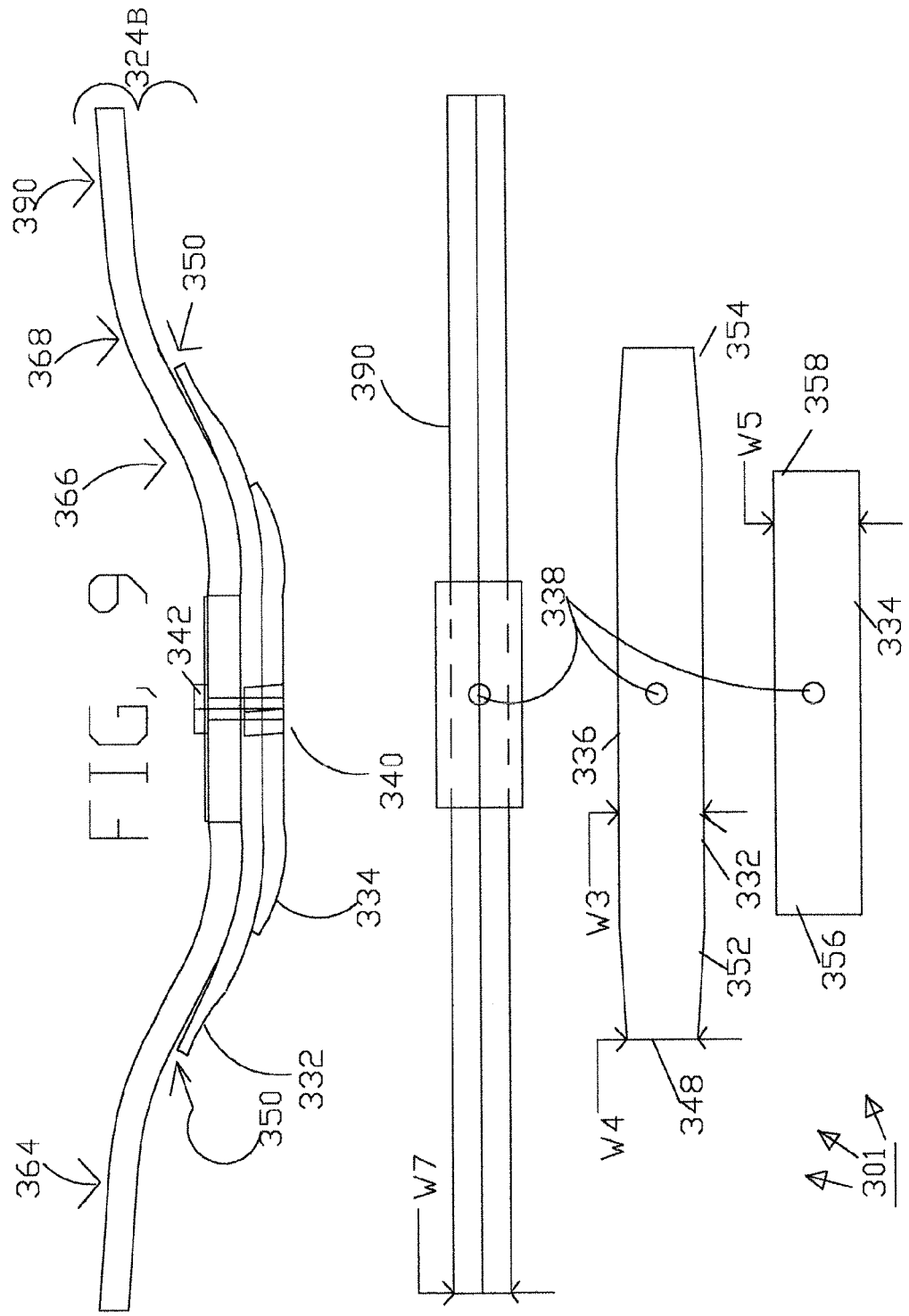

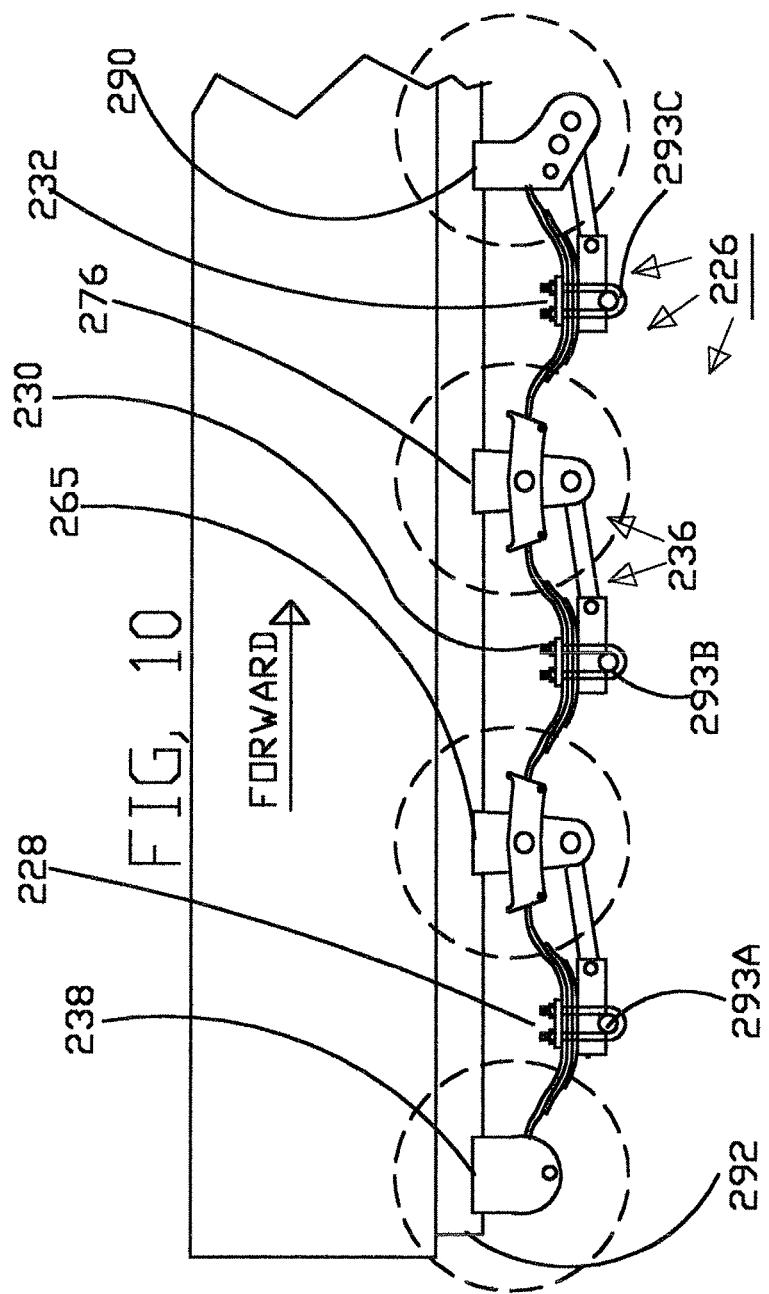

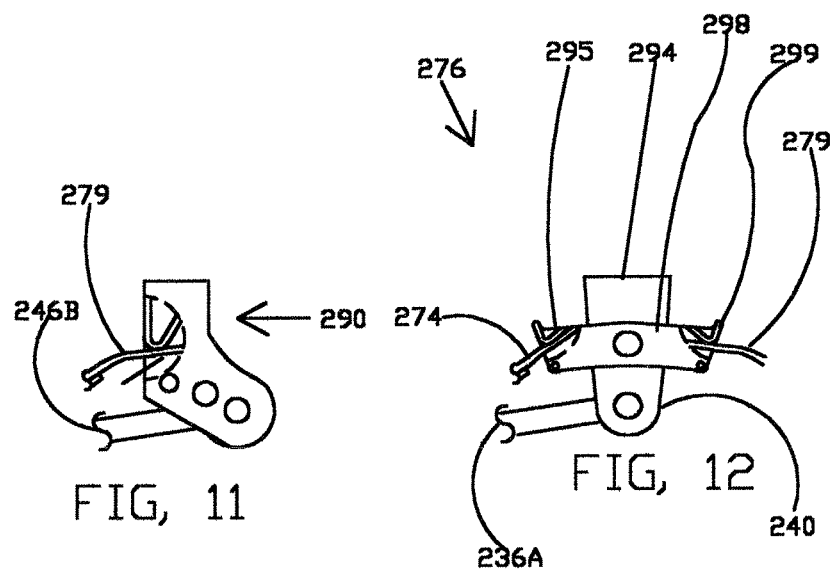
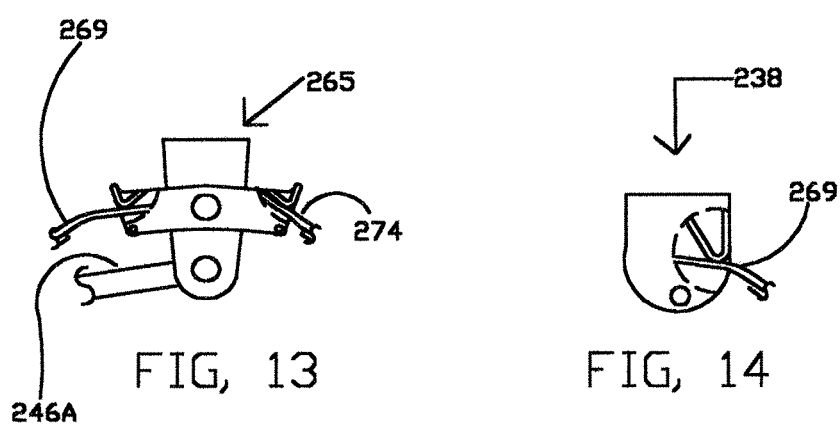

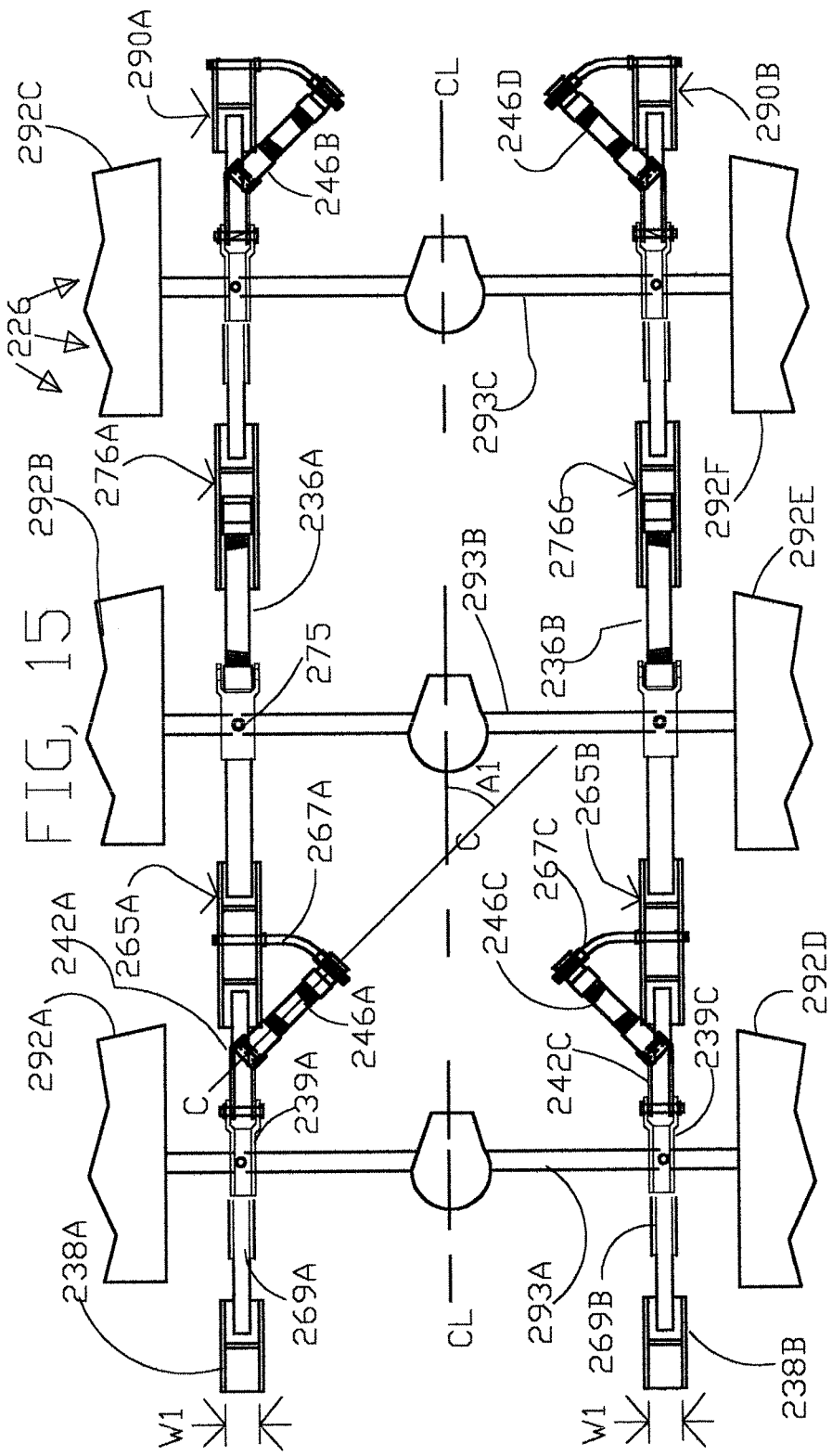

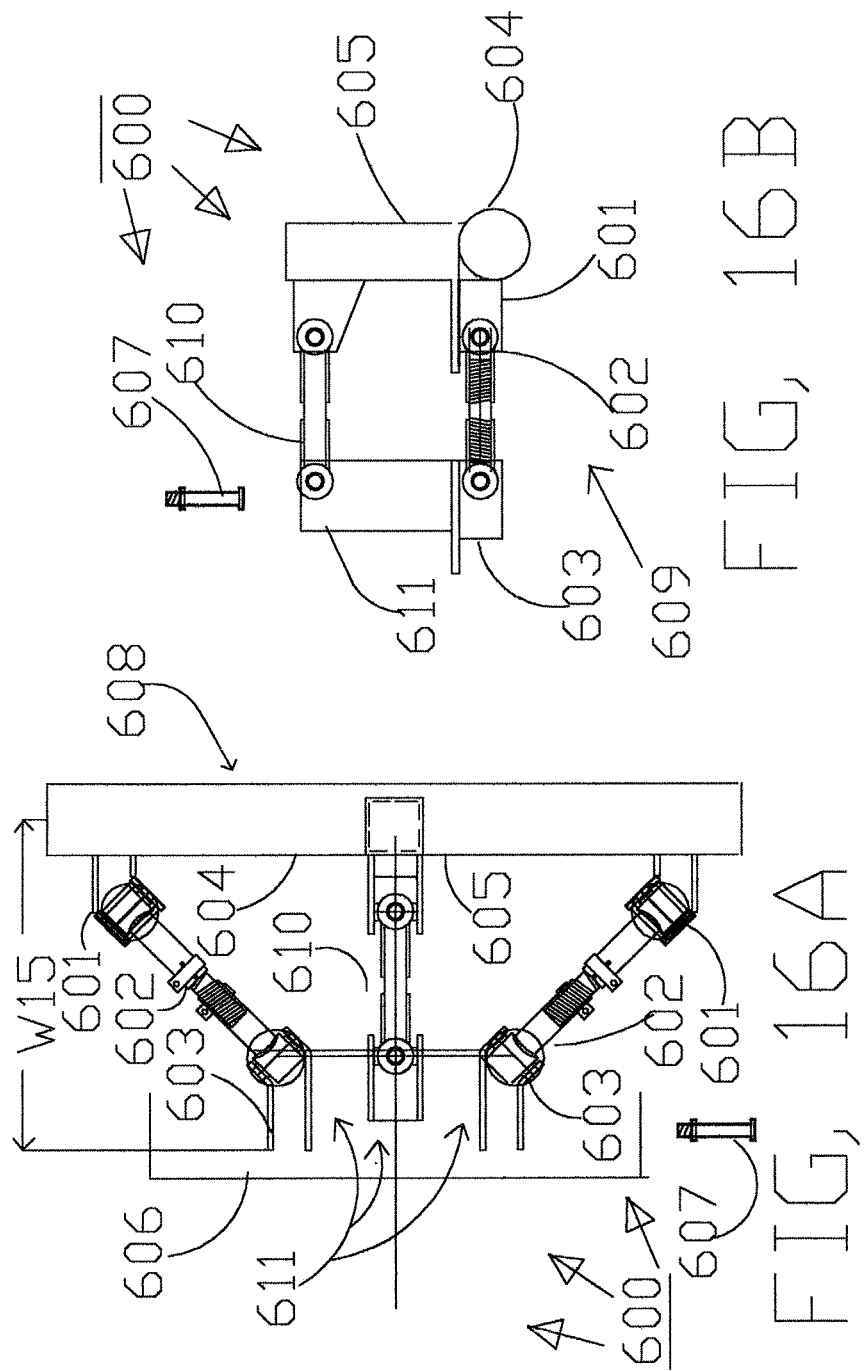

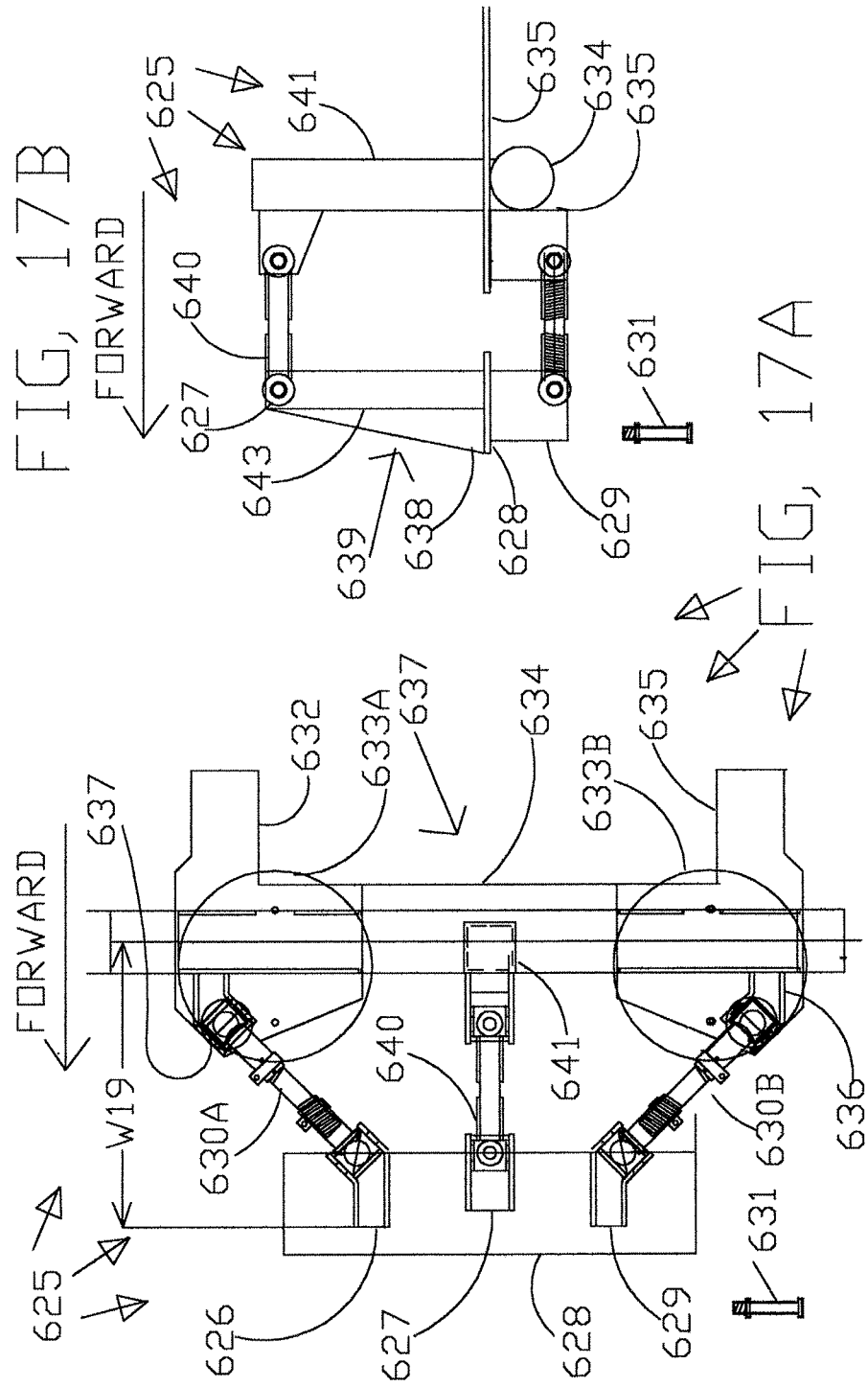

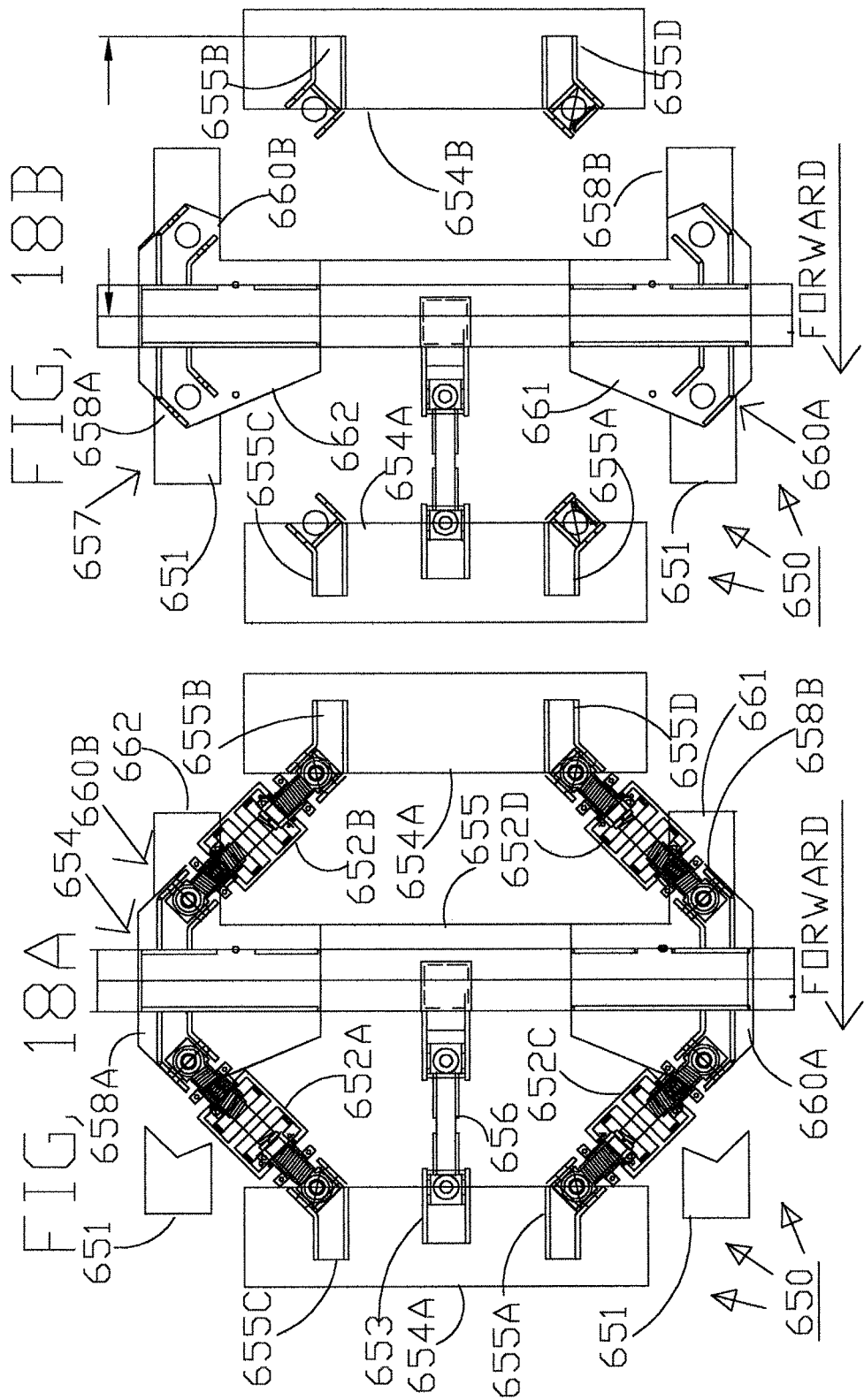

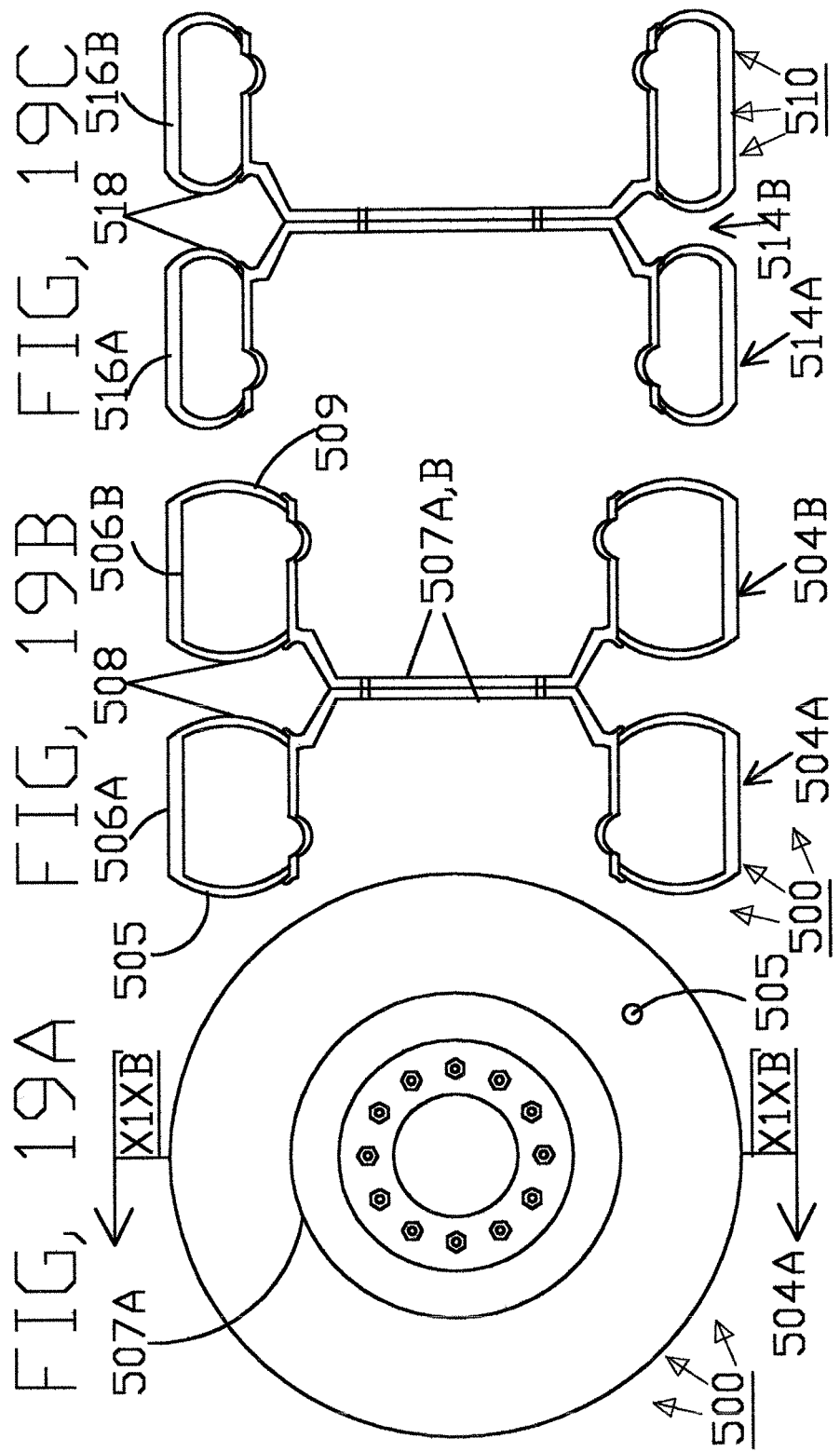

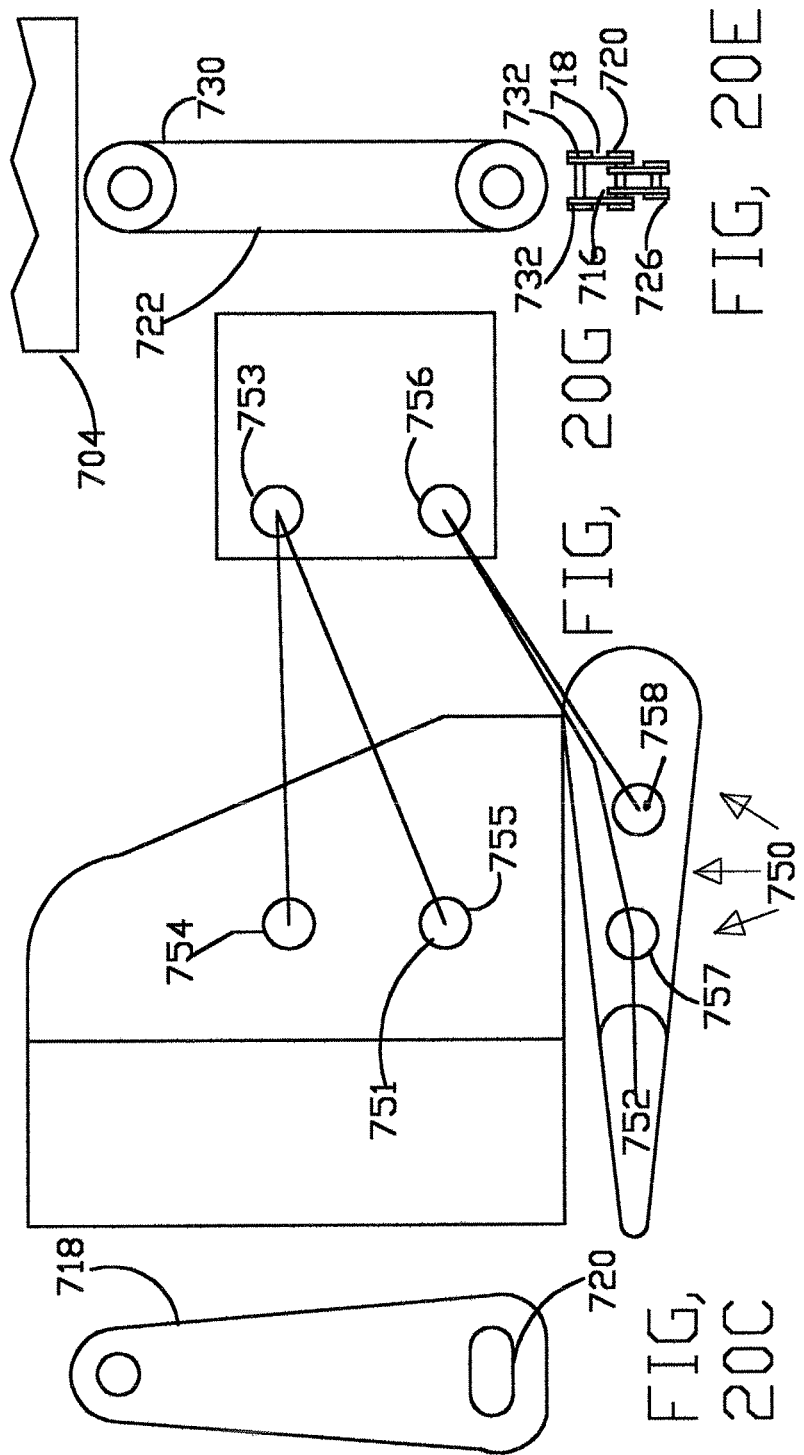

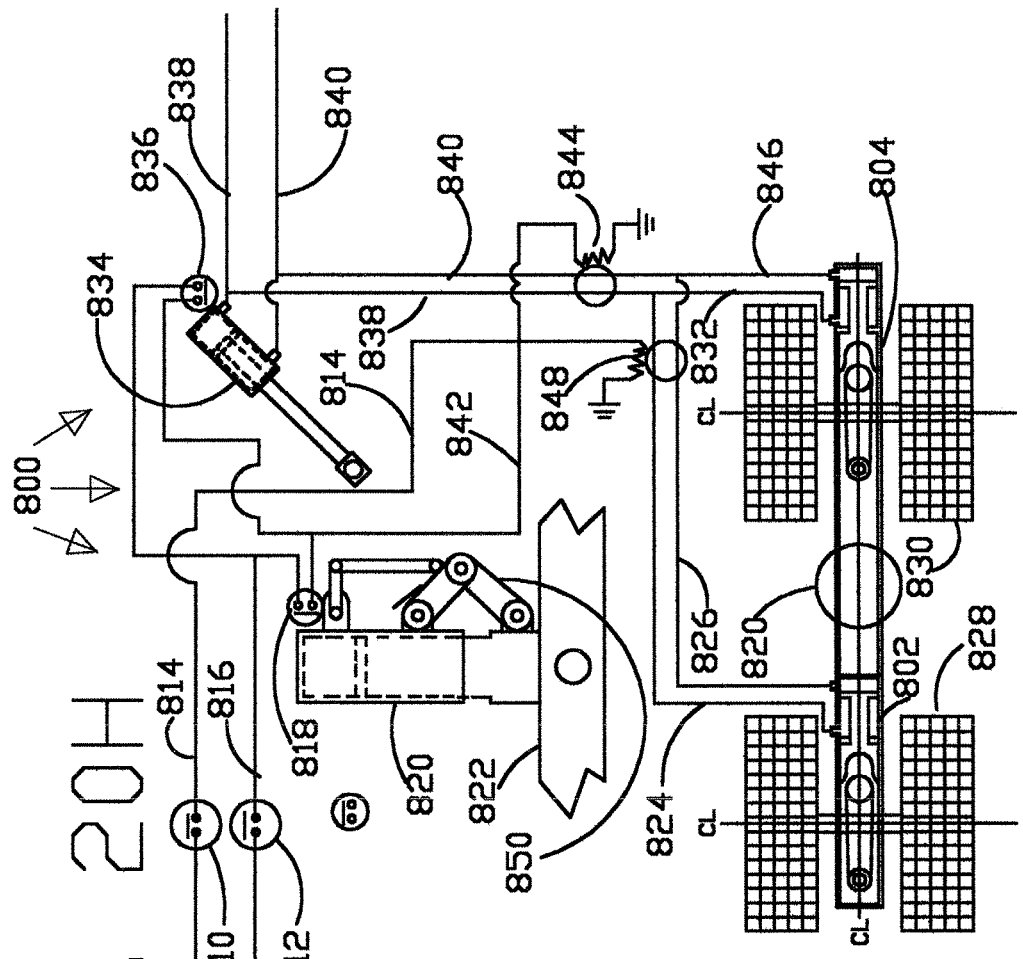
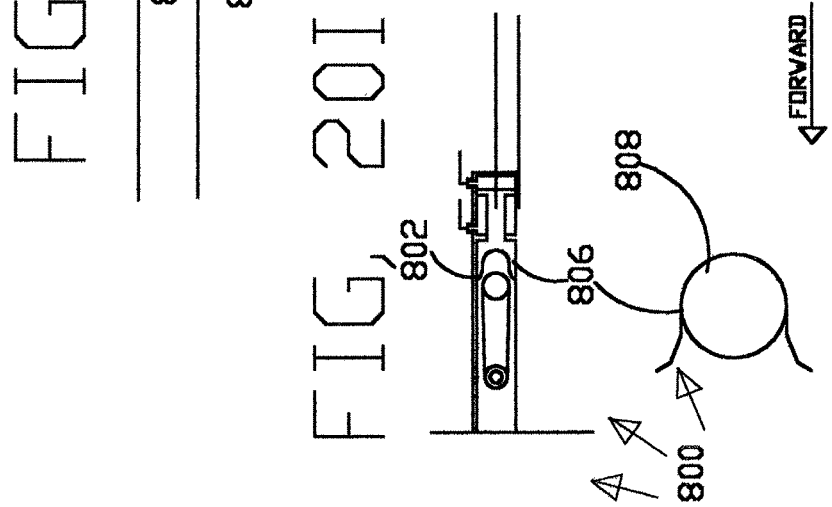

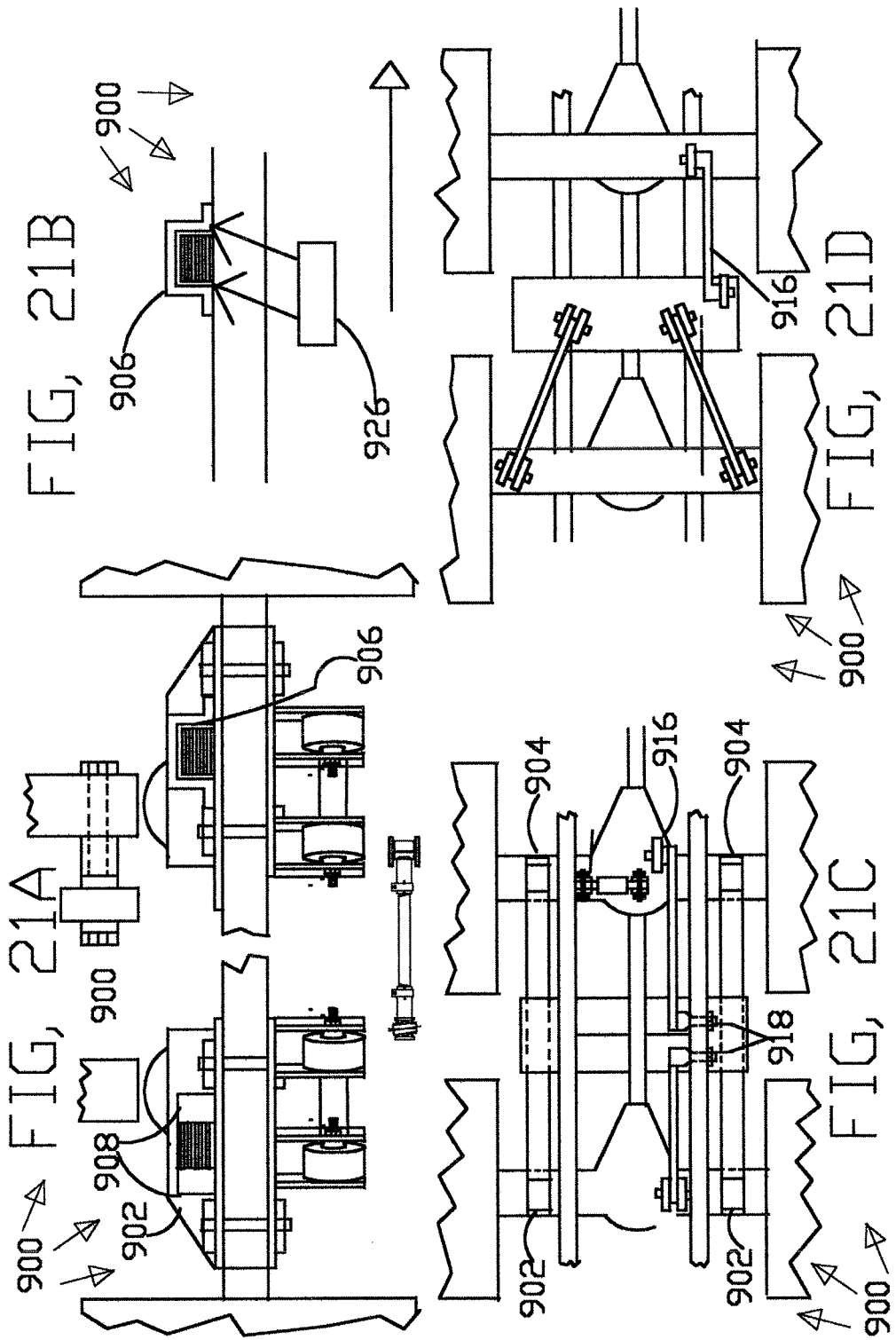

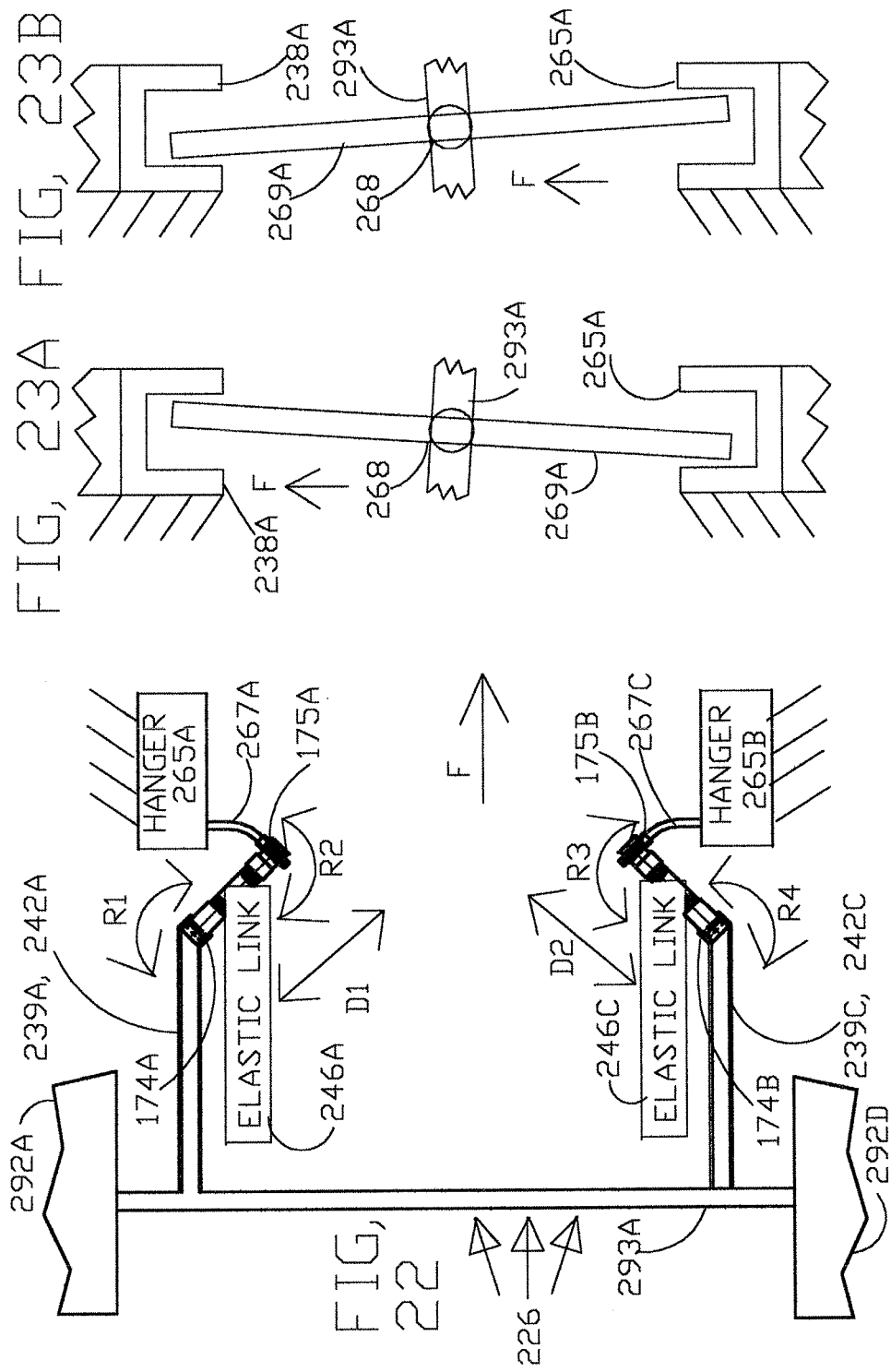

SELF-TRACKING SYSTEM FOR THE REAR AXLES OF TRUCKS

RELATED APPLICATION

The present application claims priority to U.S. provisional patent application No. 61/316,429, filed on Mar. 23, 2010; all of the foregoing patent-related document(s) are hereby incorporated by reference herein in their respective entirety(ies).

BACKGROUND OF THE INVENTION

1. Field of the Invention

This invention relates to vehicle suspension systems and, more particularly, to systems for causing the rear axles of a vehicle having a long wheel base (for example, cars, trucks, trailers, buses, heavy equipment, airplanes) to track around sharp corners.

2. Description of the Related Art

Prior art rear axle (see DEFINITIONS section) tracking systems have been disclosed in the U.S. Pat. No. 5,479,999 issued to the present inventor on Jan. 2, 1996 and entitled "Powered, Automatic, Self-Tracking System for the Rear Axles of Trucks, Trailers and Buses," (the "'999 patent") and U.S. Pat. No. 5,220,972 issued to the present inventor on Jun. 22, 1993 and entitled "Self-Tracking, Rear Vehicle Suspension System for Trucks, Trailers and Buses" (the "'972 patent").

The '972 patent discloses an apparatus for permitting the self-tracking of rear axles through angling of torsion rods coupled with means for permitting lateral deflection of the suspension hardware employed on the vehicle (for example, widening of the spring hangers on a vehicle employing a leaf-spring type suspension). More particularly, the forward ends of each pair of laterally spaced torsion rods are moved inwardly toward each other to create separate reaction forces which cause the associated axle to pivot with respect to the vehicle centerline in a direction away from the turn during cornering. Consequently, the rear tires rotate closely along the turning path of the front tires such that the rear tires "track" around the corner. The more closely the rear tires track the front tires around the turn, the easier it is for the driver to safely negotiate the turn. For example, when the rear tires closely track the front tires then the vehicle can make turns without having to use more than a single lane of the roadway as drivers of such vehicles normally do when making turns.

The '999 patent discloses power controls which automatically respond to cornering of the vehicle by applying a controlled, measured force against selected points of the vehicle's suspension system which further assist in pivoting the rear axle(s) in the appropriate direction, thereby causing the respective rear tires to self-track into the turn, in both forward and reverse directions of travel.

The following published documents may also include helpful background information: (i) U.S. Pat. No. 5,242,131 ("Watts"); (ii) U.S. Pat. No. 3,516,625 ("Houser"); (iii) U.S. Pat. No. 6,029,931 ("Encarthe"); (iv) U.S. patent application 2010/0078517 ("Coles"); (v) U.S. Pat. No. 7,392,996 ("Mattocks"); (vi) U.S. Pat. No. 6,880,839 ("Keeler"); (vii) U.S. Pat. No. 6,293,570 ("570 Gottschalk"); and/or (viii) U.S. Pat. No. 6,007,078 ("078 Gottschalk").

Description Of the Related Art Section Disclaimer: To the extent that specific publications are discussed above in this Description of the Related Art Section, these discussions should not be taken as an admission that the discussed publications (for example, published patents) are prior art for patent law purposes. For example, some or all of the discussed publications may not be sufficiently early in time, may not reflect subject matter developed early enough in time and/or may not be sufficiently enabling so as to amount to prior art for patent law purposes. To the extent that specific publications are discussed above in this Description of the Related Art Section, they are all hereby incorporated by reference into this document in their respective entirety(ies).

BRIEF SUMMARY OF THE INVENTION

One aspect of the present invention is an improved rear axle tracking systems that includes power controls to automatically respond to cornering of the vehicle by redirecting the frictional force of the road surface on the wheels. This causes the respective rear tires to self-track into the turn, in both forward and reverse directions of travel. At least some embodiments of the present invention provide an automatic, self-tracking system for the rear wheels of cars, trucks, trailers, buses and airplanes which is operable to automatically pivot the rear wheels in response to the changing frictional road force exerted on the wheels in response to the change in the path of the vehicle.

Some embodiments of the present invention provide a rear wheel self-tracking system that is: (i) responsive to friction between the tires and the road; and (ii) is operable in both the forward and reverse directions of vehicle travel. Some embodiments of the present invention use specially designed torque rods in the front and rear of each axle. In some preferred embodiments, the torque rods are selected for use based upon whether the vehicle is travelling forward or in reverse.

At least some embodiments of the present invention may provide better control by allowing: (i) a long trailer to swing away from a curb in a turn; and/or (ii) a shallow turn in reverse. Some systems according to the present invention are applicable to: (i) a Hendrickson suspensions; and/or (ii) the popular torflex axle design.

According to some embodiments of the present invention, a special spring design is used to modify existing systems with out widening the hangers, or other suspension hardware types (now known or to be developed in the future). By avoiding lateral displacement of the suspension hardware, it may be possible to easily retrofit many pre-existing suspension systems with an axle tracking system according to the present invention, thereby avoiding the need to replace the suspension system with one that is compatible with an axle tracking system.

According to some embodiments of the present invention, there are multiple types of powered hydraulic cylinder type torque rods designed for many different types of vehicles. For aircraft, many self-tracking strut rod axle systems are explained and shown. This system will also allow the use of wider and lower profile tires which, in turn, provides for increased weight carrying capacity.

In accordance with the foregoing objects, the invention comprises an automatic, self-tracking system for the rear wheels of cars, trucks, trailers, buses and airplanes. The term "self-tracking" refers to the rotation of the rear wheels along an arcing path circumscribing the corner being negotiated. According to the present invention, this is generally accomplished through pivoting of the rear wheels (and the axle supporting the rear wheels) with respect to the vehicle frame centerline in a direction away from the turn as the rear wheels approach and complete a turn. In the self-tracking system of my prior U.S. Pat. No. 5,220,972, self-tracking of the rear wheels is accomplished through angling of the vehicles torsion rods in combination with widening of the spring hangers to permit lateral deflection of the ends of the leaf-springs. As the vehicle turns, separate reaction forces are created at the forward ends of the torsion rods which pivots the associated axle in a direction allowing the rear wheels to turn the corner without skidding or riding up on the curb. In the self-tracking system of my prior U.S. Pat. No. 5,479,999, self-tracking of the rear wheels is accomplished by automatic power controls which are operable to apply a measured force to selected points of the suspension system in response to movement of preselected steering components of the vehicle so that the rear wheels will follow in substantially the same arcing path as the front wheels.

At least some embodiments of the present invention improve upon these self-tracking systems by utilizing mechanisms which permit the rear axle to pivot relative (for example, to follow the path of the front wheels), but utilize friction forces to at least help control the tracking system. While some embodiments of the present invention may be power assisted, other embodiments of the present invention may entirely dispense with the use of powered controls to actively operate the tracking system. At least some embodiments of the present invention are operable in the forward direction without power to control the self-tracking mechanisms. Some of the embodiments require no power or control, other than the frictional force of the road on the wheels and pre-existing mechanical system. Some embodiments require automatic powered controls to permit the system to operate in the reverse direction.

According to one aspect of the present invention, the axle is permitted to pivot (preferably about an axis located on the side of the axle which is the direction of travel of the vehicle) by the fact that there is "play" between a leaf spring that is mechanically connected to the axle and a hanger that sits on, and is supported by, the leaf spring. In the prior art, the hangers and leaf springs members are substantially rigidly secured to each other, at least with respect to relative motion in the horizontal plane. There are a couple of ways to achieve this "play" that allows the relative motion between the hanger (that is, the vehicle frame) and the spring (part of the axle assembly). One way is to build a new vehicle with a hanger and spring designed to have this play. It is believed that new-build assemblies according to this aspect of the present invention can be made to have a tire turning angular range of 15-16 degrees or more.

According to an especially preferred aspect of the present invention, a pre-existing vehicle, having a hanger and a spring with no play is retrofitted to connect the hanger and spring in a manner so that there is play. One way to do this is to cut the leaf spring so that it is narrower, at least at its ends (which is the part that engages the hangers). Alternatively, the leaf spring could be trimmed along its entire length. However, care must be taken not to trim the leaf spring too much because it is a weight bearing member and must maintain its structural integrity in use. In many embodiments, the width is maintained at least two inches in order to ensure sufficient structural integrity. Another way to retrofit to create the "play" for axle pivoting is to replace the pre-retrofit leaf spring with one that is narrower (at least at its ends). Another, not necessarily preferred way, is to widen the recess in the hanger, either by removing material or by replacing the hanger. In these retrofit methods, other hardware will often be added as well, such as torque rods, members to secure the ends of torque rods and/or piece parts that attach to the hangers. It is believed that retrofit assemblies according to this aspect of the present invention can be made to have a tire turning angular range of 5-6 degrees or more, which is generally enough of a range for meaningful and helpful self-steering. The retrofits of the present invention can be applied to any and all currently-common suspension systems. More generally speaking, the retrofit methods of the present invention can be applied to any suspension system that has a leaf spring that resides, and supports, a hanger.

In some preferred embodiments of the present invention (whether new build or retrofit) the amount of play between the recess in the hanger and the leaf spring is controlled so that the leaf spring and attached axle can rotate through a range of motion that ends just before a point where the tires of the axle would hit the vehicle frame.

At least some embodiments of the present invention are believed to increase traction. At least some embodiments of the present invention are believed to help prevent tractor trailers from "jack-knifing." The self steering provided by the present inventions Other objects and advantages of the present invention will in part be obvious, and in part appear hereinafter.

BRIEF DESCRIPTION OF THE DRAWINGS

The present invention will be more fully understood and appreciated by reading the following Detailed Description in conjunction with the accompanying drawings, in which:

FIG. 1A is an orthographic side view of a prior art steering system;

FIG. 1B is an orthographic side view of a portion of a first embodiment of a steering system according to the present invention configured to have a forward caster angle for improved centering ability in the forward direction of vehicle travel;

FIG. 1C is an orthographic side view of a portion the first embodiment steering system according to the present invention configured to have a reverse caster angle for improved centering ability in the reverse direction of vehicle travel;

FIG. 3A is an orthographic top view of a portion of a first embodiment of a self tracking suspension system according to the present invention that features self tracking in both forward and reverse directions;

FIG. 3B is an orthographic top view of a portion of a second embodiment of a self tracking suspension system according to the present invention that features self tracking in both forward and reverse directions;

FIG. 4A is a longitudinal cross-sectional view (cross-hatching omitted for clarity of illustration) of a first embodiment of a torque rod suitable for use in suspension systems according to the present invention;

FIG. 4B is a schematic view of a control sub-system for controlling the self steering configuration of the second embodiment suspension system;

FIG. 5A is an exploded perspective view of a portion of a prior art suspension system;

FIG. 5B is an exploded perspective view of a portion of a third embodiment of a self steering suspension system according to the present invention that is suitable for retrofit;

FIG. 6 is an orthographic top view of a portion of the third embodiment suspension system;

FIG. 8A is orthographic top and side view of a first embodiment of a spring assembly suitable for use in suspension systems according to the present invention;

FIG. 8B is an exploded orthographic top view of the first embodiment spring assembly;

FIG. 9 is orthographic top and side view of a second embodiment of a spring assembly suitable for use in suspension systems according to the present invention;

FIG. 10 is an orthographic top view a portion of the fourth embodiment suspension system;

FIG. 11 is an orthographic side view of a portion of the fourth embodiment suspension system;

FIG. 12 is an orthographic side view of another portion of the fourth embodiment suspension system;

FIG. 13 is an orthographic side view of another portion of the fourth embodiment suspension system;

FIG. 14 is an orthographic side view of another portion of the fourth embodiment suspension system;

FIG. 15 is an orthographic bottom view a portion of the fourth embodiment suspension system;

FIG. 16A is an orthographic top view a portion of a fifth embodiment of suspension system according to the present invention that is suitable for retrofit;

FIG. 16B is an orthographic side view a portion of the fifth embodiment suspension system;

FIG. 17A is an orthographic top view a portion of a sixth embodiment of suspension system according to the present invention that is suitable for retrofit;

FIG. 17B is an orthographic side view a portion of the sixth embodiment suspension system;

FIG. 18A is an orthographic top view a portion of a seventh embodiment of suspension system according to the present invention that is suitable for retrofit and provides for self steering in both the forward and reverse directions of travel;

FIG. 18B is an orthographic top view another portion of the seventh embodiment suspension system;

FIG. 19A is an orthographic side view of a tire for a tandem trailer or aircraft that has been modified to allow pivoting of the tire axle in the manner of a caster for self steering;

FIG. 19B is a view of the tire tandem or aircraft that has been modified to allow pivoting of the tire axle in the manner of a caster for self steering;

FIG. 19C is a view of the tire tandem or aircraft that has been modified to allow pivoting of the tire axle in the manner of a caster for self steering and which also has a modified tire cross-sectional profile that is made possible by the self steering of the present invention;

FIG. 20C is an orthographic view of a component of the first embodiment strut assembly;

FIG. 20E is an orthographic view of selected components of the first embodiment strut assembly;

FIG. 20G is a diagram showing an aircraft rudder and elevator connected to an automatic pilot to help explain an auto pilot method according to the present invention relating to auto pilot anticipator circuits for landing and safety;

FIG. 20H is a schematic view showing a second embodiment of an aircraft strut assembly having self steering;

FIG. 20I is a detail view of a portion of the second embodiment strut assembly;

FIG. 21A is an orthographic end view of a portion of an eighth embodiment of a suspension system according to the present invention which has self steering and is suitable for heavy duty tractors with two or more driving axles;

FIG. 21B is a view of a portion of the eighth embodiment suspension system;

FIG. 21C is an orthographic top view of a portion of the eighth embodiment suspension system;

FIG. 21D is an orthographic bottom view of the eighth embodiment suspension system;

FIG. 22 is a schematic view of a portion of the fourth embodiment suspension system;

FIG. 23A is a view of a portion of the fourth embodiment suspension system where an axle is inclined in a forward travel, right turning position; and FIG. 23B is a view of a portion of the fourth embodiment suspension system where an axle is inclined in a forward travel, left turning position.

DETAILED DESCRIPTION OF THE INVENTION

I. First Prior Art Steering System

Figure 1F:
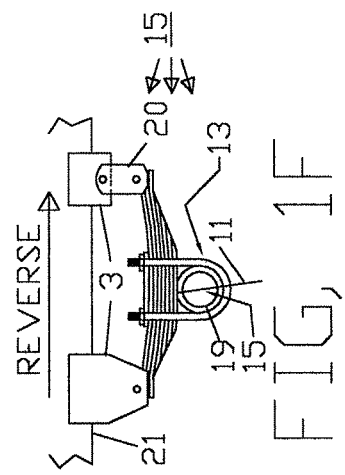
FIG. 1F is an orthographic cross sectional side view (cross-hatching omitted for clarity of illustration) of a portion of the first embodiment steering system configured to have a negative caster angle.
Figure 1E:
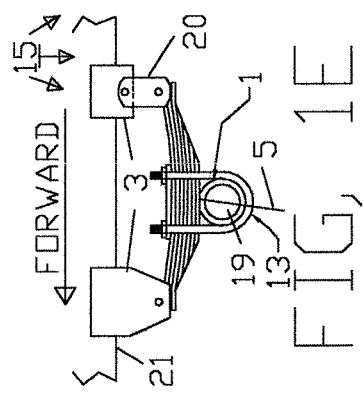
FIG. 1E is an orthographic cross sectional side view (cross-hatching omitted for clarity of illustration) of a portion of the first embodiment steering system configured to have a positive caster angle.
Figure 1D:
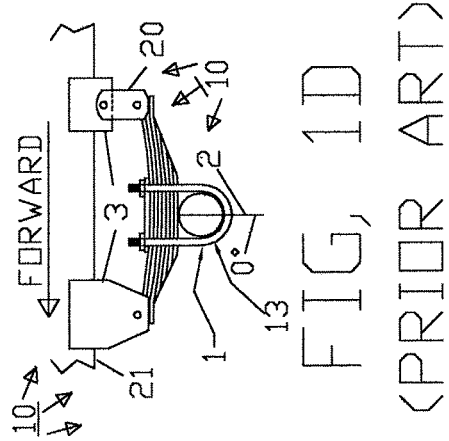
FIG. 1D is an orthographic cross sectional side view (cross-hatching omitted for clarity of illustration) of a portion of the prior art steering system of FIG. 1A.
Figure 1I:
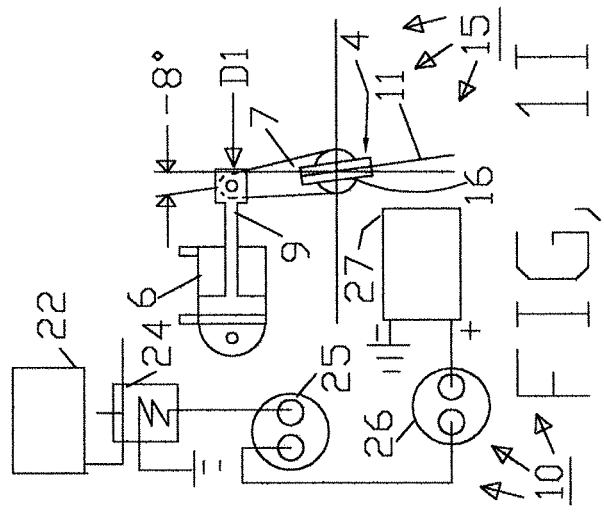
FIG. 1I is an orthographic side and schematic view of a portion of the first embodiment steering system configured to have a negative caster angle.

FIGS. 1A and 1D show a prior art kingpin steering system 10 which may be modified to make a steering assembly according to the present invention. Note that in steering system 10, the angle of the central axis of kingpin 16, relative to the vertical, is called the "caster angle." In system 10, the caster angle will always be at a zero degree (relative to the vertical) caster angle 2. It is further noted that in steering system 10, U bolt 13 directly clamps and secures axle 1. This prevents axle 1 from rotating about its central axis. In system 10, caster angle 2 remains at zero degrees, and the central axis of kingpin 16 remains vertical, regardless of whether the vehicle is being driven forward or in reverse. Other prior art steering systems (not shown) are set to have a positive caster angle (see FIG. 1B for an example of a positive caster angle) in order to improve steering and/or vehicle handling. Generally, prior art systems avoid negative caster angles (see FIG. 1C for an example of a negative caster angle).

II. First Steering System Embodiment

FIGS. 1B, 1C, 1E, 1F, 1G, 1H and 1I show various portions of kingpin steering system 15 according to the present invention. Steering system 15 includes hardware to change the caster angle while the vehicle is being operated. Preferably, the caster angle is changed so that: (i) there is a positive caster angle when the vehicle is in an appropriate driving mode for forward motion (for example, first gear); and (ii) there is a negative caster angle when the vehicle is in an appropriate driving mode for reverse motion (for example, reverse gear). By changing the caster angle while the vehicle is being operated, the caster angle can be adjusted "on-the-fly" to provide improved steering and/or handling depending upon the manner in which the vehicle is being driven at any given time.

System 15 includes: axle 1; hangers 3; steering arm 4; forward caster angle 5 (+8 degrees); control 6; leverage arm 7; control arm connection 9; reverse caster angle 11 (−8 degrees); U bolt 13; wheel assembly 14; kingpin 16; spring assembly 17; sleeve bearing 19; spring crank link 20; chassis 21; and valve control system 22,24,25,26,27. These Figures show a state of the art heavy duty steering axle 1 which is mechanically connected to chassis 21 through hangers 3, U bolt 13, spring link 20, spring assembly 17 and sleeve 19. The spring assembly flexes on load changes. As shown in FIGS. 1G, 1E and 1F, U bolts 13 secure sleeve bearing 19, which allows the axle to rotate about its central axis. Steering arm 4 therefore rotates about two orthogonal axes as follows: (i) it rotates about the central axis of the kingpin to turn the wheels for steering purposes (as in prior art kingpin steering systems); and (ii) it rotates about the central axis of axle 1 (for improved steering according to the present invention). In FIGS. 1A, 1B, 1C, 1D, 1E and 1F only one side is shown. The other side is a minor image view facing into the vehicle.

Figure 1H:
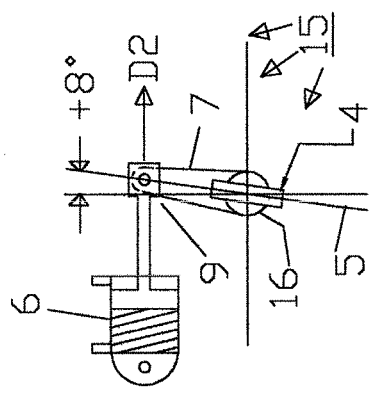
FIG. 1H is an orthographic side view of a portion of the first embodiment steering system configured to have a positive caster angle.
Figure 1G:
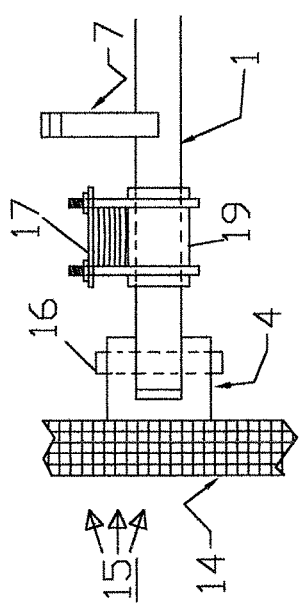
FIG. 1G is an orthographic end view a portion of first embodiment steering system.

In FIGS. 1B, 1E and 1H, king pin 16, steering arm 4 and axle 1 are rotated, about the central axis of the axle, to +8° caster angle, for positive centering during a forward direction operation of the vehicle. This is possible by because simple sleeve bearing 19 allows the axle 1 to rotate relative to U bolt 13 and chassis 21. This rotation is effected by using a leverage arm 7, which is: (i) rigidly mechanically connected (for example, welded) to the top of axle 1 at one of its ends; and (ii) rotatably mechanically connected at its other end to control 6 through control arm connection 9; and (iii) actuated by control 6 to rotate the axle and to thereby rotate the kingpin. Control 6 is preferably structured as an air operated standard air brake control which is designed to be normally extended with out any air pressure, such as a Bendix #229814 or equivalent. The actuation of control 6, through at least the range of motion shown in FIGS. 1E and 1F, could be accomplished with air, hydraulics or electric, and preferably would match what is available on the unit.

FIG. 1C shows inclination of the king pin at −8° caster angle so that axle 1 will self steer in the reverse direction according to the present invention. Bearing 19 allows axle 1 to rotate about its central axis to thereby rotate the central axis of the kingpin relative to the vertical. When vehicle is running, power is supplied from battery 27 to ignition switch 26 and a reverse operated switch 25 on the transmission. Switch 25 is a standard item on all vehicles. In the case of reverse direction operation, electrical power is supplied to valve 24 to open the valve against its bias (that is, bias toward closed). The opening of valve 24, when the vehicle is being operated in the reverse direction, allows air from air tank 22 through valve 24 to apply air pressure to an air inlet (no separate reference numeral) of control 6. When control 6 is pressurized with air flowing through valve 24 (in its open position), this causes the control to pull on the end of leverage arm 7 in the direction D1 (see FIG. 1I). This motion, in turn, causes the leverage arm to rotate attached axle 1. This rotation, in turn, causes kingpin 16 to rotate to a −8° angle, relative to the vertical, for improved reverse self steering.

On the other hand, when the vehicle's transmission is set for forward operation of the vehicle, switch 25 opens up to cut the supply of power from the battery to valve (or air solenoid) 24. The removal of power to the valve causes it to move, according to its bias, to the closed position. This releases the pressurization of control 6, which causes the control to expand, or move, in the D2 direction (see FIG. 1H). This, in turn, causes the leverage arm, axle and kingpin to rotate to second caster position 5 (+8 degrees), which is a preferred position for forward direction operation of the vehicle.

FIG. 1G shows king pin 16, spring assembly 17 and axle 1 as standard parts. The presence of leverage arm 7, extending from axle 1, allows rotation of the kingpin, during operation of the vehicle, according to the present invention. Arm 7 is welded to axle 1 so when power is applied axle will rotate back or forward as desired, and as explained above. Sleeve bearing 19 is designed to allow this operation, as mentioned above. Axle 1 can also be a driving axle, like on a four wheel drive vehicle. The construction of system 15, with its rotation of the caster about two orthogonal axes, is a great improvement over using the standard drop down I beam front axle. The standard drop down I beam axle has poor ground clearance and requires a lot of power and many special parts to twist the axle against the vehicle's weight.

III. Second Steering System Embodiment

Figure 2A:
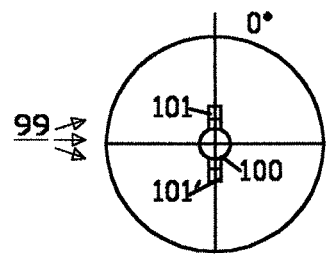
FIG. 2A is an orthographic side view of a second embodiment of a steering system of the present invention having an adjustable caster angle for improved centering in the forward and reverse directions of vehicle travel.
Figure 2B:
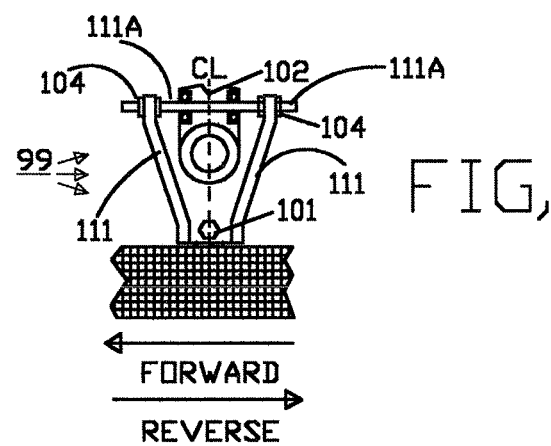
FIG. 2B is an orthographic top view of a portion of the second embodiment steering system.
Figure 2C:
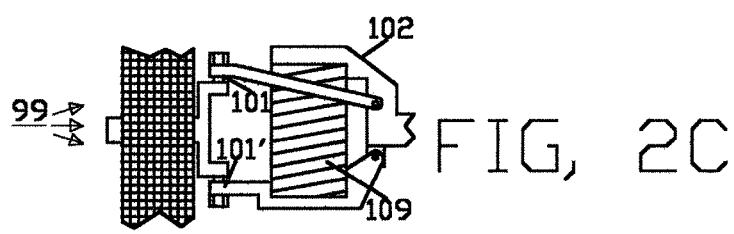
FIG. 2C is an orthographic end view of a portion of the second embodiment steering system.
Figure 2D:
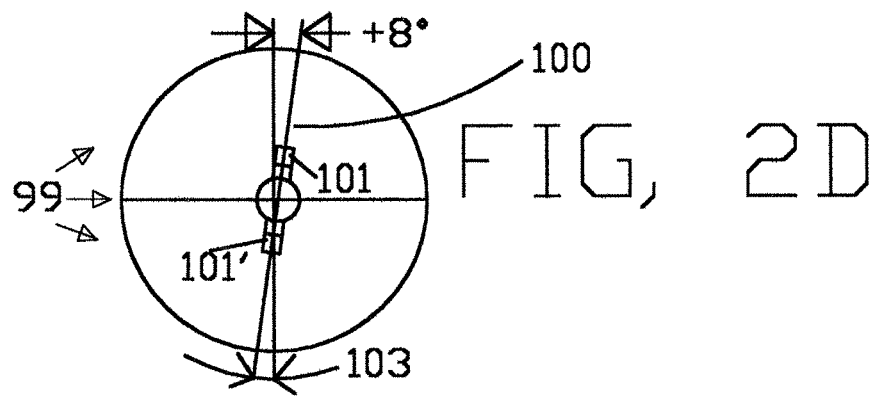
FIG. 2D is an orthographic side view of a portion of the second embodiment steering system configured to have a positive caster angle.
Figure 2E:
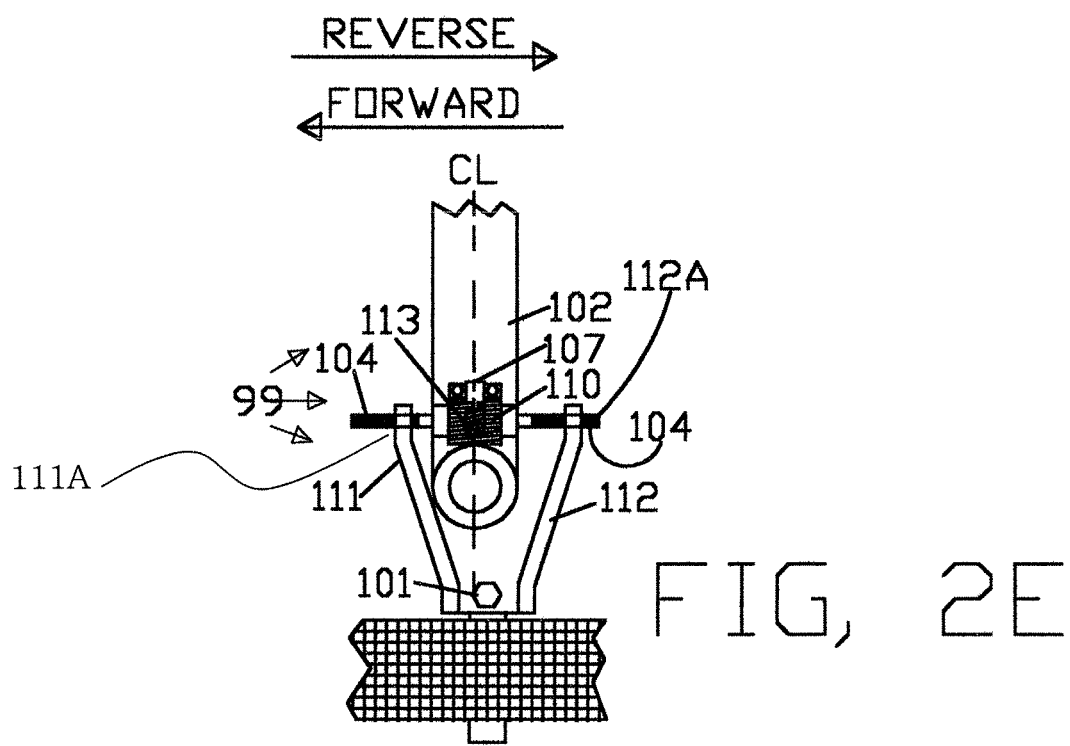
FIG. 2E is an orthographic top view of a portion of the second embodiment steering system configured to have a positive caster angle.
Figure 2F:
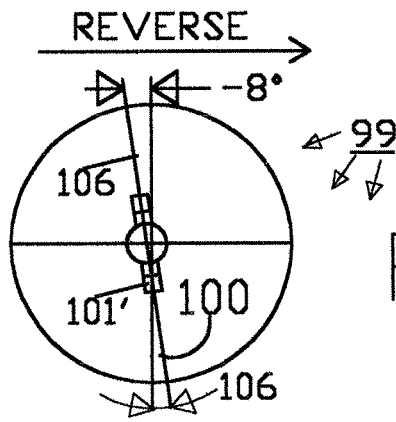
FIG. 2F is an orthographic side view of a portion of the second embodiment steering system configured to have a negative caster angle.
Figure 2G:
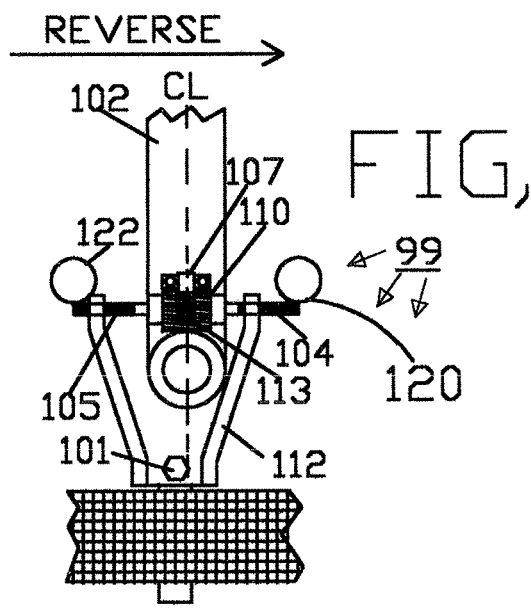
FIG. 2G is an orthographic top view of a portion of the second embodiment steering system configured to have a negative caster angle.
Figure 2H:
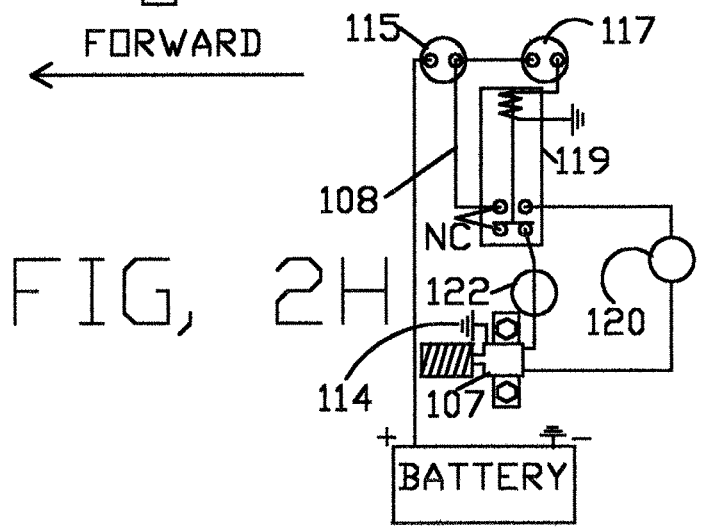
FIG. 2H is a schematic view of a caster angle control sub-system of the second embodiment steering system.

FIGS. 2A to 2H show another steering system 99 according to the present invention that is based on a prior art ball joint steering suspension system. In system 99, as in system 15 discussed above, the caster angle can be changed while the vehicle is in operation, depending upon the manner in which the vehicle is being driven. In system 99, as in system 15 discussed above, the caster angle will be positive when the vehicle is in forward and the caster angle will be negative when the vehicle is driven in reverse. FIGS. 2A, 2B and 2C show system 99 when the vehicle is stationary, and the caster angle is zero. FIGS. 2D and 2E show system 99 when the vehicle is driven in the forward direction, and the caster angle is positive. FIGS. 2F and 2G show system 99 when the vehicle is driven in the reverse direction, and the caster angle is negative. As with system 15, this adjustment of the caster angle, which occurs while the vehicle is in operation, helps improve steering and/or handling. System 99 includes: steering suspension axis (or king pin) 100 (defined by upper ball joint 101 and lower ball joint 101'); main frame 102; motor assembly 107 (which includes a grounded terminal 114); spring 109; upper A frame 111,112; spiral gear 113; ignition switch 115; reverse transmission switch 117; solenoid 119; limit switch 120; limit switch 122; and battery 121.

FIG. 2A shows steering suspension axis 100 at 0° caster angle with upper ball joint 101 and lower ball joint 101' being aligned in the vertical direction. Many components of system 99, such as upper ball joint 101, lower ball joint 101', main frame 102; upper A frame 111,112 and spring 109 are the same as in prior art ball joint suspension steering systems. The upper A frame 111 is shown in FIG. 2B in the position where it where is normally aligned in most vehicles.

FIGS. 2D and 2E shows how system 99 self tracks in the forward direction, such that kingpin 100 is tilted +8° at positive angle 103. To accomplish this, upper A frame 111 is moved in the reverse direction relative to main frame 102, as can be seen by comparing FIGS. 2B (zero caster angle with the upper A frame at nominal position) and 2E (positive caster angle due to reverse direction motion of the upper A frame). The motion of upper A frame 111,112 to make a positive caster angle is accomplished as follows: (i) spiral gear 113 and motor assembly 107 drives gear 110 to turn; (ii) the turning of gear 110 drives threaded shaft 104 to rotate about its central axis; (iii) threaded engagements 111a,112a between threaded shaft 104 and upper A frame 111,112 make the rotation of threaded rod 104 move upper A frame in the reverse direction to thereby create a positive caster angle.

FIGS. 2F and 2G show how system 99 is adjusted so that it will have a negative caster angle 106 (in this example, a −8° angle) when the vehicle is driven in the reverse direction. This adjustment is accomplished as follows: (i) power from battery 121 is sent to ignition switch 115; (ii) power then goes from ignition switch 115 to reverse transmission switch 117; (iii) the reverse transmission switch turns on when the vehicle is put into reverse; (iv) when the reverse transmission switch is turned on, power is sent along to solenoid 119 to actuate it and thereby switch on limit switch 122 (from its normal off position); (v) the turning on of limit switch 122 allows power to be sent to and to drive into motion two direction motor assembly 107; (vi) the driving of motor 107 drives threaded rod 104 to rotate about its central axis; (vii) the rotation of threaded rod about its central axis, and its threaded engagement 111a,112a with upper frame 111,112, causes upper A frame 111,112 to translate in the forward direction relative to main frame 102; (viii) the forward motion of upper A frame 111,112 inclines kingpin 100 so that it takes on a negative caster angle; (ix) this translation of upper A frame 111,112 will continue until the forward arm 111 of upper A frame 111,112 hits and turns off limit switch 122; and (x) the turning off of limit switch 122 cuts power to motor 107 so that the motion of the motor, the threaded rod and the upper A frame will all stop when the upper A frame has moved forward to a point where the kingpin has a caster angle of −8 degrees. The motion of the upper A frame changes the caster angle because the upper A frame holds upper ball Joint 101 and the position of this ball joint will move with the upper A frame, thereby adjusting the inclination angle of the kingpin that the upper ball joint defines. As stated above, a caster angle of −8° has been found to be preferable for improved reverse self steering.

When the vehicle is shifted out of reverse and into a forward gear, reverse transmission switch 117 opens and power which causes solenoid 119 to move back to its closed position. This causes power to be transmitted through the normally closed contacts and through limit switch 120, thereby powering motor 107 in the reverse direction. The reverse direction operation of motor 107 causes threaded rod 104 to rotate about its central axis in the reverse direction. The rotation of the threaded rod in the reverse direction, and its threaded engagement with the upper A frame, causes the upper A frame to translate in the reverse direction, at least until it hits and trips limit switch 120, which defines the reverse direction limit on the range of motion of upper A frame 111,112. In the embodiment of steering system 99, the reverse direction limit will position the upper A frame, and it upper ball joint so that the kingpin has a caster angle of positive eight degrees, which caster angle is preferred for self-steering for forward direction vehicle travel.

Some variations on systems 15 and 99 will now be mentioned relating to the caster angle and the control of the caster angle. The forward and reverse caster angles may not be plus/minus eight degrees for all embodiments of the present invention. For example, the forward direction caster angle might be +12 degrees and the reverse caster angle might be −4 degrees. As a further example, both the forward vehicle travel direction caster angle and the reverse vehicle travel direction caster angle could be positive, presumably with the forward vehicle travel direction caster angle being larger than the reverse direction angle (this might allow, for example, quicker switching of caster angles in response to changes in the vehicle gear). In the systems 15 and 99, there are only two caster angles for forward and reverse (or possibly three caster angles in variations where the caster angle is brought to zero degrees when the vehicle is in neutral or park). However, there could be more caster angles and caster angles could be controlled in more refined ways. For example, the driver could be provided with a user input (for example a dial) in order to manually adjust caster angle while driving. In other embodiments caster embodiment might be adjusted based, at least in part, on vehicle speed or acceleration. Control of the caster angle could be based, at least in part, upon how sharply the vehicle is turning at a given point in time and/or the steering history of the vehicle tracked over some interval of time preceding the present moment in time. However the caster angle is to be controlled during active operation of the vehicle, steering systems 15 and 99 provide a couple of different ways of effecting the changes in caster angle.

IV. Prior Art Suspension Systems

Discussion will now shift from the subject of kingpin inclination to the subject of pivoting of an axle in the horizontal plane about a vertical central axis located at the longitudinal centerline CL of the vehicle. This pivoting of an axle in the horizontal plane about a vertical central axis located at the longitudinal centerline CL of the vehicle will herein be referred to as "axle pivoting." Both the 999 Patent and the 972 Patent deal with the use of torque rods to cause axle pivoting as the vehicle is making a turn. As discussed in these patents, the axle, a first torque rod, a second torque rod and a cross bar form a four bar linkage with the cross bar serving as the grounded link. The cross bar is located in the forward direction with respect to its axle. The rotating connections between the torque rods and the cross bar and the axle are spaced apart so that the four bar linkage is generally trapezoidal in shape. In operation, the four bar linkage, under the influence of forces exerted from the road, through the wheels and to the axle, will cause axle pivoting so that the path of the wheels of the rear axle will tend to track the path of the wheels of the front axle through a turn in the forward direction of vehicle travel. However, the torque rod-and-cross-bar four bar linkage of the 999 Patent and the 972 Patent will not cause the axle pivoting for self tracking in the reverse direction of travel.

In a sense, the explanation of the previous paragraph is an oversimplification. That is because the torque rods may not be structured as rigid links as in a classic four bar linkage. Rather the torque rods may expand and collapse so that they can vary in length somewhat. However, for the sake of clarity and understanding, the term "four bar linkage" will be used to describe these linkages even when they have torque rods that can change in length. One embodiment of a torque rod that changes in length, which is currently preferred for use in four bar linkages according to the present invention, will be discussed below in connection with FIG. 3D.

The 999 Patent discloses that extraneous hardware can be used to force a rear axle to pivot in a self-tracking manner when the vehicle is operated in the reverse direction. (See, 999 Patent at discussion of axle pivoting mechanisms 32 to 43.) However, this solution to reverse travel direction axle pivoting for self tracking involves the expense and complication of the extraneous hardware. This extraneous hardware also was required to be powered on a continuous basis during reverse direction axle pivoting. Unlike the forward direction self tracking, which uses the differences in friction forces on the wheels at either end of the axle to actuate pivoting of the axle and thereby perform self-tracking, the reverse direction axle pivoting requires the vehicle use its own power to actuate reverse direction of travel axle pivoting for self tracking. One concern of embodiments according to the 999 Patent is that the extraneous reverse direction of travel axle pivoting system will not operate quickly and/or accurately enough to perform optimal self-tracking in the reverse direction of travel.

V. First Suspension System Embodiment

Figure 3C:
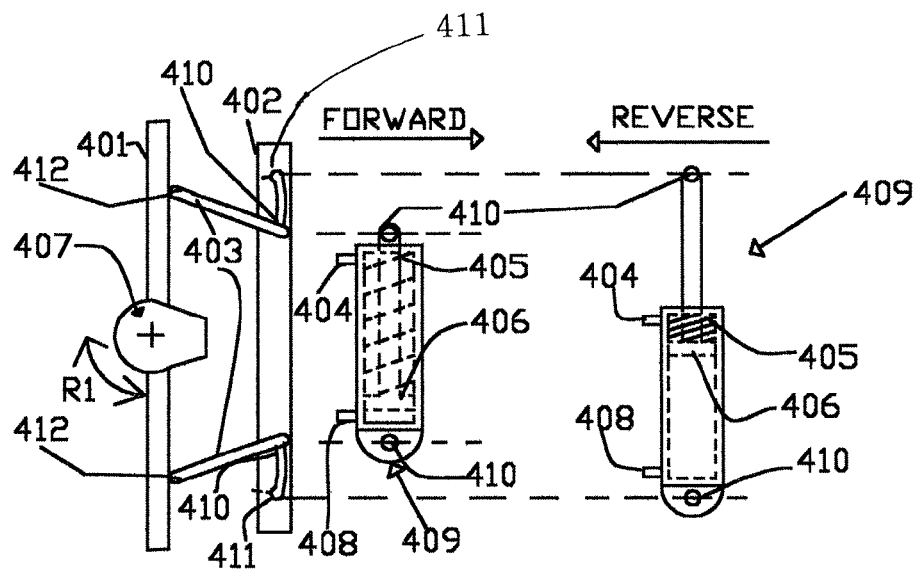
FIG. 3C is an exploded orthographic top view of a portion of the first embodiment suspension system.

FIGS. 3A and 3C show an embodiment of an axle pivoting system 400 according to the present invention. In system 400, a four bar linkage is used for axle pivoting (about vertical axis 407 in the R1 direction) for self tracking in both the forward and reverse directions of vehicle travel. While this system may require some vehicle power to be used to switch between a forward direction position and a reverse direction position, it does not require power to force the axle to pivot. Rather, friction forces on the wheels provide the axle pivoting force in both forward and reverse directions. Not only does this reduce the amount of hardware required, but it also helps ensure that both forward and reverse direction axle pivoting operations will be optimally responsive to the turning that the vehicle is doing at any given moment of time. System 400 includes: axle 401; forward direction cross bar 402; forward direction torque rods 403; first inlet 404; spring 405; piston 406; second inlet 408; hydraulic cylinder main body 409; torque-rod-to-cross-bar rotating connections 410; cam channels 411; and torque-rod-to-axle rotating connections 412.

FIG. 3A and the left side of FIG. 3C show a top view of the four bar linkage 401,402,403 in its forward direction position. Note that torque rod connections 410 are located at the inwards ends of cam channels 411. In its forward position, four bar linkage 401,402,403 is similar in its trapezoidal geometry to the four bar linkages described in the 999 Patent, and it operates similarly to the comparable system of the 999 Patent for performing axle pivoting for self tracking during turns in the forward direction of travel. System 400 is biased in its forward position because, as shown in the middle portion of FIG. 3C, spring 405 forces piston 406 down into the interior space of hydraulic cylinder 409 so that both connection points 410, one at either end of the hydraulic cylinder, are both maintained in the most inwardly position that cam channels 411 in cross bar 402 will allow. In the forward position shown at the middle portion of FIG. 3C, inlet 404 is preferably used to act as a hydraulic reservoir to maintain a constant fluid level in the system, and the pressurization it provides over piston 406 may assist the spring bias in maintaining the forward position of the four bar linkage.

When the vehicle is shifted into reverse, the pressure through inlet 404 is released and inlet 408 is pressurized. The result of this, as shown at the right side portion of FIG. 3C: (i) piston 406 and the main body of cylinder 409 mutually move outwards with respect to each other; (ii) connections 410, at either end of the cylinder, move outwards under the guidance of cam channels 411; and (iii) the four bar linkage comes to occupy its reverse direction position (not shown). In this reverse direction position, the general geometry of the four bar linkage is again trapezoidal, but the torque-rod-to-cross-bar connections 410 are now further apart than the torque-rod-to-axle connections 412. It is this change in position to the reverse position that allows system 400 to perform axle pivoting in the reverse direction using friction forces transmitted through the wheels to the axle. When the vehicle shifted out of its reverse gear, inlet 408 is depressurized so that spring 406, and any pressure at inlet 404, will move hydraulic cylinder 409 back into the position shown at the middle portion of FIG. 3C.

The shifting of the position of the four bar linkage, between forward position and reverse position, could be accomplished in other ways, besides the use of a hydraulic cylinder. However, the use of a hydraulic cylinder is currently preferred because: (i) most trucks have a ready and reliable supply of hydraulic pressure; and/or (ii) the shifting of position can be performed quickly. Note axles shown are driving types but trailer axles operate the same. It may also be possible to make a variation on system 400 where the locations of the torque-rod-to-cross-bar connections remain stationary, but the locations of the torque-rod-to-axle connections are changed in position between a forward position and a reverse position.

VI. Second Suspension System Embodiment and Torque Rod

Figures 3D, 4C:
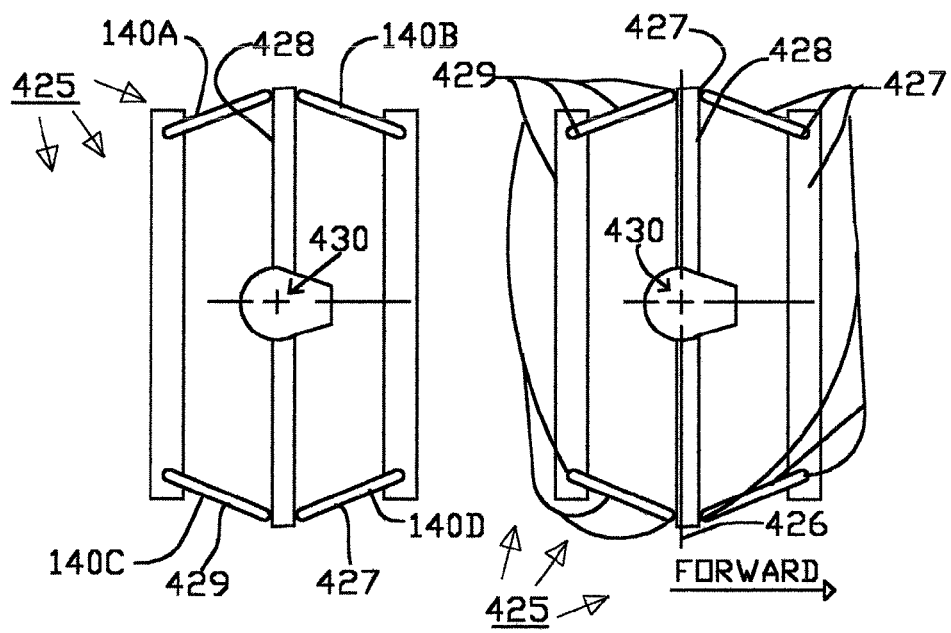
FIG. 3D is an orthographic top view of a portion of the second embodiment suspension system.
FIG. 4C is an orthographic top view of the second embodiment suspension system.

FIGS. 3B and 3D show another steering system 425 where: (i) four bar linkages are used to perform axle pivoting for self tracking in both the forward and reverse directions; and (ii) the axle pivoting is actuated by forces transmitted from the road to and through the wheels at either end of the axle. However, system 425 is different than system 400 because, instead of using a single cross bar and varying the positions of the torque rod connections, a different four bar linkage is used depending upon whether the vehicle is travelling in the forward direction or the reverse direction. More specifically, in system 425, the forward four bar linkage is similar to the linkage disclosed in the 999 Patent and the reverse linkage is a mirror image about the central axis 426 of axle 428. System 400 includes: forward direction four bar linkage 427; pivoting axle 428; and reverse direction four bar linkage 429.

In operation, when the vehicle is in a reverse gear: (i) reverse four bar linkage 429 is in active mode and causes the axle to pivot (about one or more axes rearwards of vertical axis 430) in response to friction forces; and (ii) forward four bar linkage 427 is in inactive mode and acts as a shock absorber. In operation, when the vehicle is not in a reverse gear: (i) forward four bar linkage 427 is in active mode and causes the axle to pivot (about one or more axes located in the frontwards direction from vertical axis 430) in response to friction forces; and (ii) reverse four bar linkage 429 is in inactive mode and acts as a shock absorber.

As mentioned above, preferred torque rods for use in the present invention are not rigid and may vary in length. FIG. 4A shows torque rod assembly 140 according to the present invention and FIG. 4B shows pressure control system 190 for controlling the hydraulic pressure in assembly 140 so that it may act as a good torque rod in the steering systems of the present invention. Assembly 140 includes: first manifold inlet 166; second manifold inlet 167; first hydraulic two-chamber cylinder 168; second hydraulic two chamber cylinder 172; first tie rod 174 and second tie rod 175. System 190 includes: torque rod assemblies 140*a*,140*b*,140*c*,140*d*; ignition switch 141; transmission switch 142; battery 143; reservoir 150; pump 151; fluid lines 152,154,155,158,159,196; relief valve 164; relay 165; first solenoid 156; second solenoid 157; and pump assembly 195.

Cylinder 168 includes specially designed self bleeding valves (not shown, sometimes referred to as "special bleeders") due to the fact that bleeding would be hard to perform. Tie rod 174 is mechanically connected to the piston of cylinder 172. Tie rod 175 is mechanically connected to the piston of cylinder 168. Inlet 167 is a manifold inlet line that pressurizes cylinder 168 to be fully closed, at the same time, pressures cylinder 172 to be fully open. This makes it possible to have a calibrated length between the terminations of the tie rods so that assembly 450 can function well as a torque rod. Inlet 166 is another manifold inlet that allows oil from the reservoir to fill the chambers in cylinders 168 and 172 that are not connected to manifold inlet 167 which makes the assembly act as a shock absorber and allows the assembly to be lengthened or shortened (for example, lengthened or shortened by two inches) relative to the fully pressurized position when both chambers of both cylinders have equal pressure. The manner in which the pressure at manifold inlets 166 and 167 is controlled in operation will be discussed with reference to system 190 of FIG. 4B.

The special bleeders, mentioned above, may be made for top mounting or side mounting and operate automatically. The bleeder bodies include openings to release air and floats to float on the hydraulic fluid and to close the port when the chamber fills. A top mounting special bleeder a male thread end is down, a male end is to the side and a female thread is for the ballast line. In side mounting of special bleeders a male thread is for side mounting and the female there is for the ballast line.

As shown in FIG. 4B, system 190 is based on a standard state of the art power steering system that has been modified to pressurize four torque rod assemblies 140*a*,140*b*,140*c* and 140*d*. As shown in FIG. 4C, these four torque rod assemblies can be used in the steering system 425 explained above in connection with FIG. 3D as the torque rods for forward direction four bar linkage 427 and reverse direction four bar linkage 429.

As shown in FIG. 4B, hydraulic reservoir 150 supplies oil to pump 151 through line 196. The pump then pumps oil to the steering box (not shown) and also through lines 152 and 154. Pressure relief valve 164 selectively operates to: (i) return oil to reservoir 150 through line 159 and thereby relieve excess pressure; and (ii) supply a pressure through line 159 at 3-way solenoids 156 and 157. Note that a one axle system is explained here in connection with FIGS. 4B and 4C, but any amount of axles can be added to this system as needed or desired.

When ignition switch 141 is on, power from battery 143 supplies power to transmission switch 142 (normally open) and to relay 165 to terminals C and D. Because contacts B and D are normally closed, this means that solenoid 157 will be turned on, so that: (i) there is fluid communication from line 154 to line 158; and (ii) the (normally) closed side of solenoid 157, which is connected to line 159, will remain closed. When solenoid 157 is turned on, torque rod assemblies 140*b* and 140*d* are pressurized which puts steering system 425 in a forward mode so that the forward direction four bar linkage 427 (including torque rod assemblies 140*b* and 140*d*) will be operative to pivot the axle in an appropriate manner for forward self steering. In forward mode, torque rod assemblies 140*a* and 140*c* are de-pressurized so that they merely act as shock absorbers and do not act as torque rods, thereby rendering reverse four bar linkage 429 substantially inoperative when the vehicle is not in reverse gear.

When vehicle is shifted into its reverse gear, transmission switch 25 closes and powers relay 165, in turn opening contacts B and D and thereby turning off solenoid 157. When relay 165 is on, contacts A and C are closed which powers solenoid 156 to turn on. The turning on of solenoid 156 opens line 154 into fluid communication with line 155. This fluid communication pressurizes torque rod assemblies 140*a* and 140*c* so that they begin to act as torque rods and reverse mode is entered where reverse four bar linkage 429 is operative to pivot the axle for self tracking in reverse direction turns. In this reverse mode, the closing of fluid communication between line 154 and line 158, by the closing of solenoid 157 causes depressurization of torque rod assemblies 140*b* and 140*d* so that these now merely act as shock absorbers and forward four bar linkage 427 is substantially inoperative.

Referring back to the oil that passed through relief valve 164 is directed to a 10% restriction (not shown) and back to the reservoir 150. However upstream of the restriction, line 159 maintains a light pressure due to the restriction hardware and sends hydraulic oil to line 155 (when solenoid 156 is closed) and line 158 (when solenoid 157 is closed) to maintain some oil in the torque rod assemblies, that are not pressurized at a given time, for purposes of lubrication, acting as a shock cushion and/or as a reservoir.

VIII. Third and Fourth Embodiment Suspension Systems (Retrofits)

To understand retrofit suspension systems according to the present invention, it is helpful to first understand a portion of conventional suspension systems that do not have a self steering feature, and are thus prime candidates for retrofit. FIG. 5A shows a prior art retrofit suspension assembly 200 for making a prior art self steering system. Prior art suspension 200 includes: first member 202; spring 204; second member 206; and third member 208. One end of spring 204 rests inside first member 202. The median point of spring 204 is attached to second member 206. Opposite end of spring 204 rests inside third member 208, for which the opposite end of second member 206 bolts thru. This item is capable of a sufficient range of axle angular motion (for example 70 degree axle angle) making it possible for self steering over the road and most street turns without any tire drag.

Figure 7A:
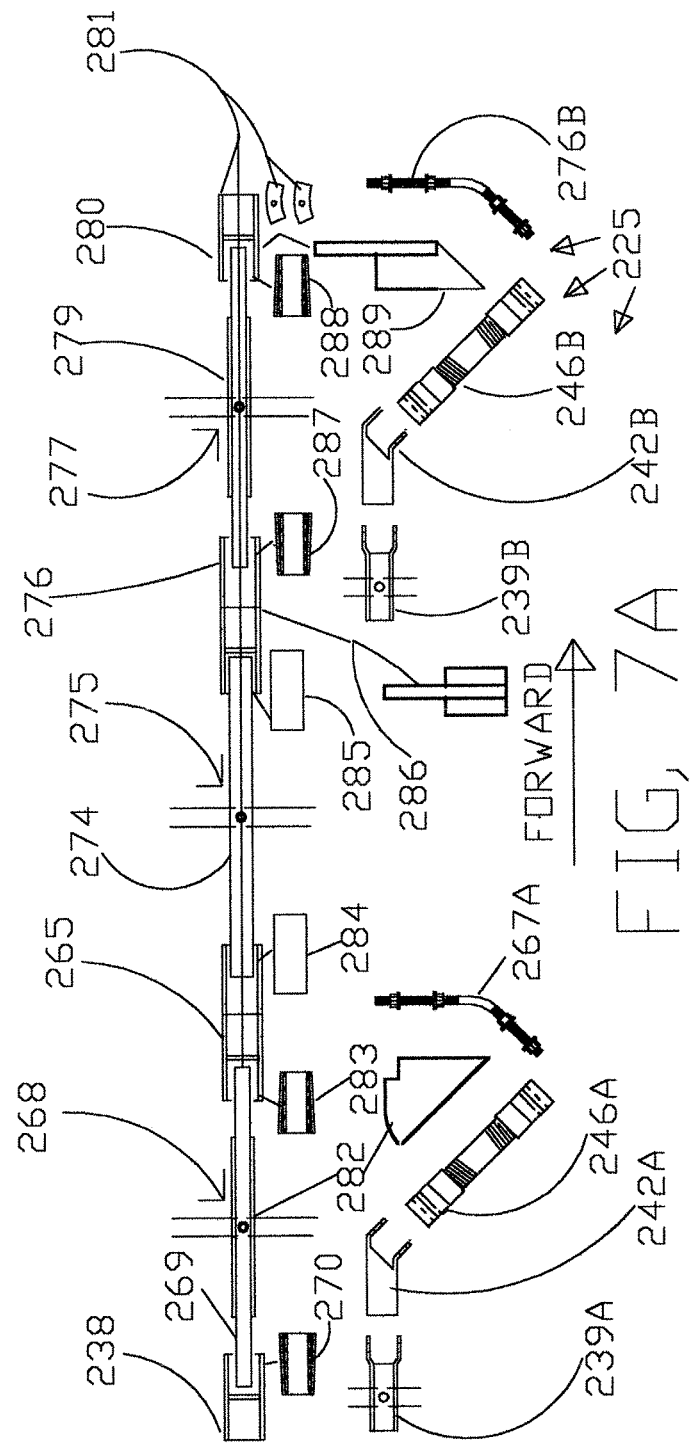
FIG. 7A is an orthographic bottom view of a portion of the third embodiment suspension system.

FIGS. 5B, 6 and 7A show various portions of retrofit suspension assembly 225 for making a self steering system according to the present invention. Assembly 225 includes: first member 227; first U-bolt assembly 228; spring 229; second U-bolt assembly 230; third U-bolt assembly 232; center axle 234; center axle connection hardware 236; third member 237; first hanger 238; actual mounting part 239; lower hanger portion 240; nut 241; encapsulation member 242; first end portion 243; first outer mounting fitting 245; torque bar assemblies 246; torque bar 247; first threaded end portion 249; second threaded end portion 251; second outer mounting fitting 253; inner mounting portion 255; flange nuts 257; second end portion 259; bolt 261; second hanger 265; curved threaded members 267; connection hardware 268; spring 269; first alignment tool 270; spring 274; connection hardware 277; spring 279; fourth hanger 280; hanger hardware 281; first extra heavy duty hardware set 282; second alignment tool 283; first rebuild hardware 284; second rebuild hardware 285; second extra heavy duty hardware set 286; third alignment tool 287; fourth alignment tool 288; and third extra heavy duty hardware set 289. FIGS. 6 (lower portion only), 7B, 10-15, 22, 23A and 23B show various portions of a new build suspension assembly 226, which is largely similar to assembly 225, but includes some components which are different (or simply not shown in the other Figs.) including: mounting member 263; substitute fourth hanger 290; hanger hardware 291; rocker arm 294; first bearing surface 295; upper hanger portion 298; second bearing surface 299; lower hanger portion 240; axles 293; rotating tie rod connection 174 (see also FIG. 4A); rotating tie rod connection 175 (see also FIG. 4A); and vehicle frame 292. Components that are repeated multiple times in the assembly will sometimes use a lower case letter as a subscript, but sometimes these repeated parts are mirror images of each other (for the right and left sides of the trailer) instead of being identical.

Assembly 225 is a new improvement that can be installed on all trailers, trucks, equipment and aircraft with no drag. Assembly 225 allows the axles to move angularly by any amount that the clearance between the tires and existing frame will clear. One end of spring 229 rests inside of first member 227. The median point is securely bolted to the axle. The opposite end of spring 227 rests inside third member 237 to which one end of curved threaded member 267 is bolted securely. The opposite end of curved threaded member 267 is bolted thru one bearing end of torque bar assembly 246. Opposite end of torque bar assembly 246 is bolted to encapsulation member 242, which is firmly bolted to the median of spring 229 and the existing axle (not shown). This assembly can be more fully understood with reference to other Figures. Assembly 225 allows self steering on all road and city street turns without any drag on parts or tires. Assembly 225 can operate properly on 10 foot spread axle assemblies with no drag, tire saving and also saves energy.

Referring to FIG. 6, torque bar assembly 246 includes torque bar 247; first outer mounting fitting 245; and inner mounting portion 255. Torque bar 247 includes first threaded end portion 249 and second threaded end portion 251. The first outer mounting fitting is securely and rigidly connected to first end portion 243 and is disposed and movably encapsulated by encapsulation member 242 within outer mounting portion 245. The inner mounting portion is includes a moveable brass bearing to allow friction free motion to any degree necessary to perform self tracking turning. Inner portions 243 and 255 define an angle A1 (preferably 44 degrees) between torque rod 247 and encapsulation member 242. Torque bar assembly 246 has a bearing portion at both ends 243, 259. Torque bar assembly 246 is attached to encapsulation member 242 at one end by a bolt 242 with a threaded end. At the end opposite the encapsulation member, torque assembly 246 is bolted to curved threaded member 267 to allow relative rotational motion with substantially no resistance. Encapsulation member 242 serves as a connecting link between an end of the torque assembly and actual mounting part 239. Encapsulation member 242 is secured to actual mounting part 239 by bolt 261 and nut 241. In non-retrofit embodiments of the present invention, components 239 and 242 are replaced by mounting member 263 as shown in the lower part of FIG. 6.

Figure 7B:
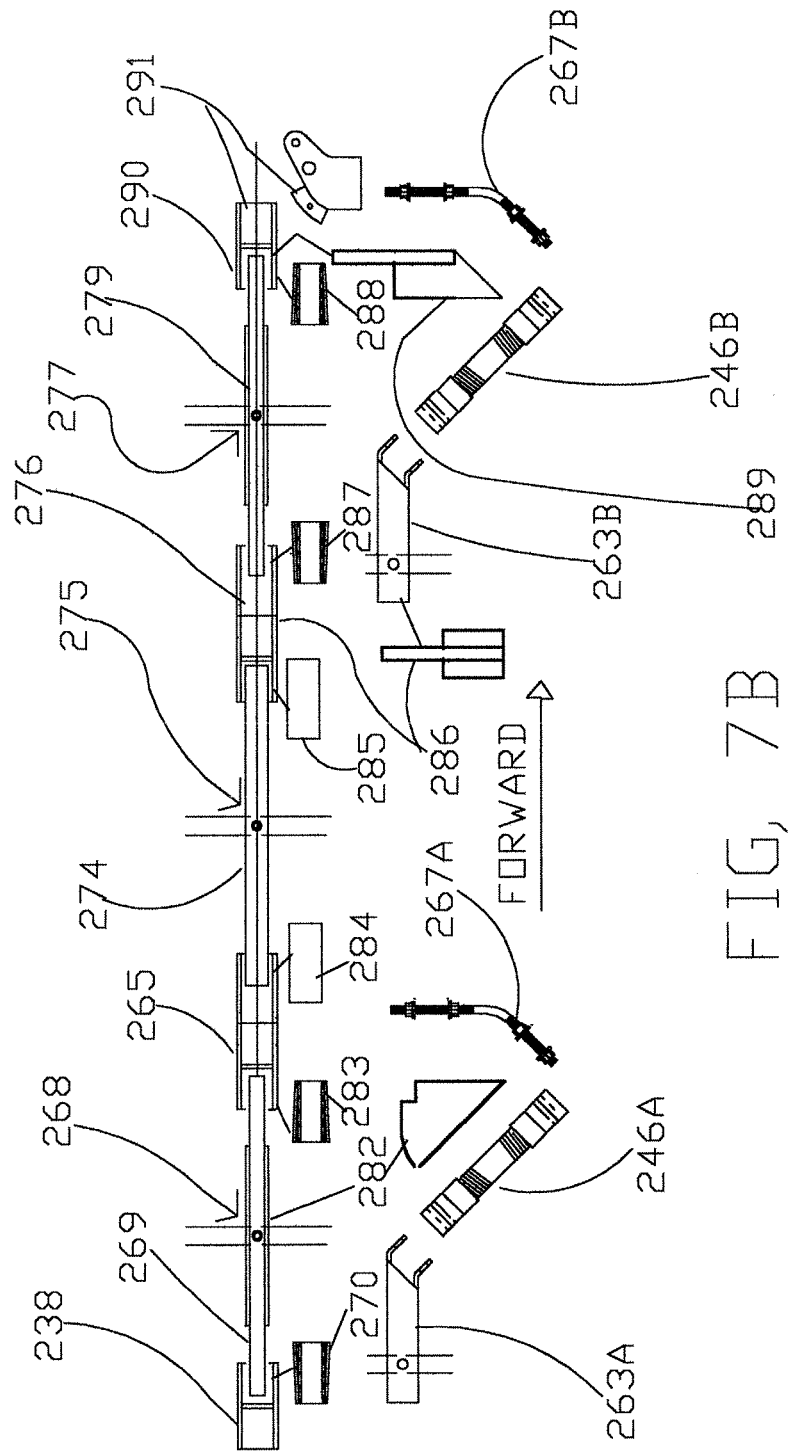
FIG. 7B is an orthographic bottom view of a portion of a fourth embodiment of a self steering suspension system according to the present invention that is suitable for retrofit.

FIG. 7A shows a fuller version of retrofit assembly 225 that includes many adapters. FIG. 7B shows assembly 226, which is largely similar to assembly 225, but is a non-retrofit (or "new work") design for a 3 axle system. Assemblies 225 and 226 will qualify for regular duty, heavy duty and extra heavy duty. Other axles can be attached if needed.

As shown in FIGS. 7A and 7B, hangar 238 serves as the rear hangar for one end of spring 269. The mid-point of spring 269 is connected to a first axle by connection hardware 268. Hanger 265 serves as the forward hanger for spring 269. Hanger 265 also serves as the forward hanger for spring 274. Spring 274 is connected to the central axle by connection hardware 275. Hanger 276 serves as: (i) the forward hanger for spring 274; and (ii) the rear hanger for spring 279. The mid-point of hanger 279 is connected to the forward axle by connection hardware 277. In assembly 225 (see FIG. 7A), hanger 280 serves as the forward hanger for spring 279 and includes hanger hardware 281 which is designed to allow proper use for self steering as shown. In assembly 226 (see FIG. 7B), hanger 290 serves as the forward hanger for spring 279 and includes hanger hardware 291 which is designed to allow proper use for self steering as shown.

Curved threaded members 267a and 267b are 44 degree angle bolts threaded on both ends with flange nuts 257 (see FIG. 6). Assemblies 225 and 226 both include many modifications for proper alignment and preferred additions on all axles according some special uses, such as extra heavy duty use. Assembly 225 (See FIG. 7B) shows a standard axle system converted to self steer and to maximize turning ability for sharper turns.

In assembly 226 (see FIG. 7B) substitute hangar 290 includes hanger hardware 291 as a safety feature, making assembly 226 especially suitable for extra heavy duty applications. As mentioned above, mounting members 263a,263b of assembly 226 serve as a substitute components for 239a, 239b,242a,242b which are present in retrofit assembly 225 (see FIG. 7A).

Both assemblies 225 and 226 include extra heavy duty hardware sets 282, 286 and 289, which are add-ons to reinforce the assemblies for extra heavy duty use. In assembly 225 (see FIG. 7a), hanger hardware 281 is welded in position as per a direction sheet furnished to retrofit customers. Assemblies 225 and 226 are aligned using alignment tools 270, 283, 287 and 288 to install the springs in a perfect alignment with the hangers.

Rebuild hardware 284 and 285 include parts used to rebuild the hangar 265 and 276 and the correct use of this rebuild hardware is preferably explained in a direction sheet furnished on purchase.

For spring 274 the original (pre-retrofit) spring can be used on retrofit units, but is preferably substituted in new build units by a specially-designed spring with all leaves being the same as in spring 279, except the main leaf which is specially designed. This main leaf of spring 274 is preferably 0.788 inches thick and 3 inches wide with tapered thickness on the ends. This specially designed spring is denoted by reference numeral 274' in assembly 226 (see FIG. 7B).

Referring now to FIGS. 10-14 which show more detailed views of hangers 238, 265, 276 and 290 according to the present invention. As shown in FIGS. 10 and 12, hanger 276 serves as a saddle and is mechanically connected to center axle 234 through center axle connection hardware 236. Hanger 276 further includes rocker arm 294 which includes a first bearing surface 295 and a second bearing surface 299. Hangar 276 further includes a lower portion 240 and an upper portion 298 securely connected to the vehicle frame by conventional means such as welding. As further shown in FIG. 12, on end of the leaf spring 274 is in bearing contact with the bearing surface 295 and extends outward therefrom. One end of a torque bar is securely connected to the saddle by conventional means such as U-bolts and nuts.

FIG. 15 shows a top view of suspension assembly 226 including three axles 293a,b,c and six wheels 292a,b,c,d,e,f. Axles 293a and 293c are the ones retrofitted with torque rod assemblies according to the present invention.

FIG. 22 is a diagram showing the motions allowed by the four bar assemblies present in suspension assembly 226. Hangers 265a, 265b and curved threaded members 267a, 267c effectively form the grounded link because they are all rigidly mechanically connected to the vehicle frame (see FIG. 10 at reference numeral 292). The two opposed trapezoidal links are formed by two torque rods 246a and 246c. It is highly preferred that these be elastic (some embodiments of the present invention may even be rendered inoperable if they are rigid links), and it is even more highly preferred that these links each be constructed similarly to torque rod 140 (discussed above in connection with FIG. 4A. As shown in FIG. 22, torque rod 246a is elastic in the D1 direction and torque rod 246c is elastic in the D2 direction. As discussed above, these links must be pressurized (or otherwise have a relatively high spring coefficient in order for the self steering assembly to work. If elastic links 246a,c are depressurized to have a low spring coefficient, then they will merely act as shock absorbers without effecting self steering. The last link in the four bar linkage is made up of axle 293a, wheels 292a, 292d and members 239a, 242a, 239d, 242d. This link is not completely rigid at least in the sense that the tires rotate about the longitudinal central axis of the axle. In various embodiments of this invention, this "link" may or may not be substantially rigid in other respects, but for purposes of understanding the self steering of the present invention, it may be helpful to think of it as a rigid link in the trapezoidal four bar.

As explained above, each end of each torque rod has tie rod connections, respectively 174 and 175. This provides for rotating connections between the four links of the four bar self steering linkage. Specifically, as shown in FIG. 22: (i) tie rod connection 174a is rotatable in the R1 direction; (ii) tie rod connection 174b is rotatable in the R4 direction; (iii) tie rod connection 175a is rotatable in the R2 direction; and (iv) tie rod connection 175b is rotatable in the R3 direction.

FIGS. 23A and 23B (not to scale for illustrative purposes) show how the transverse direction "play," between the uppermost leaf spring (in the leaf spring stack) and the portions of the hangers that are supported by the spring stack, is important for the axle pivoting functionality according to the present invention. FIG. 23A shows how the whole spring stack (and the axle to which it is connected) can rotate within the hangers in the forward direction, right turning direction. FIG. 23B shows how the whole spring stack (and the axle to which it is connected) can rotate within the hangers in the forward direction, left turning direction. This is why it is important to use an uppermost spring leaf that is either narrow in the transverse direction over its entire length, or at least tapered to be narrow at the ends. It is this narrowness that creates the "play" that allows axle pivoting with the vehicle frame that is supported in the vertical direction through the axle.

Exemplary suspension assemblies 225 and 226 of the present invention have been shown in connection with two and three axle vehicles. The present invention, however, may be easily configured for used with vehicle having more then three axles.

IX. First and Second Spring Assembly Embodiments

The detailed construction of a preferred spring assemblies 300 and 301 according to the present invention will now be explained with reference to FIGS. 8A, 8B and 9. More specifically, assembly 300 is shown in FIGS. 8A and 8B. Spring assembly 301 is a variation on assembly 300 and is shown in FIG. 9. Assemblies 300 and/or 301 include: spring stack (of assembly 300) 224a; spring stack (of assembly 301) 324b; upper leaf spring (of assembly 300) 330; upper leaf spring (of assembly 301) 390; middle leaf spring 332; lower leaf spring 334; median portion of middle leaf 336; thru hole 338; bolt 340; nut 342; first end of middle leaf 348; tapered portions of middle leaf 352; second end of middle leaf 354; first end of lower leaf 356; second end of lower leaf 358; first end portion of upper leaf 364; median portion of upper leaf 366; and second end portion of upper leaf 368.

The leaves of spring stack 324 include: an upper leaf spring 330 (or 390 in assembly 301); a middle leaf spring 332, and a lower leaf spring 334. Upper leaf spring 330 of assembly 300 (or 390 of assembly 301) includes the following longitudinal sections: first end portion 364, median (or bearing) portion 366 and second end portion 368. At the longitudinal center of each of the leaf springs 330,332,334 is a thru hole 338. Leaf springs 330,332,334 are securely fastened together as a stack in the thickness direction with conventional fastening hardware, such as a bolt 340 and nut 342. As shown in FIG. 8B, the upper leaf spring has width W1 (preferably 2 inches) over its entire length to allow for movement of its end portions 364 and 368 within the bearing surface of the channels (not shown) in which the ends reside when the suspension system is fully assembled. As shown in FIGS. 8B and 9, middle leaf spring 332 has: (i) width W3 over its median portion 336; (ii) width W4 at its first and second ends 348,354; and (iii) where width W3 is greater than width W4 so that the ends of the middle leaf spring are tapered at tapered portions 352.

As shown in FIGS. 8B and 9, lower leaf spring 334 comprises of first and second ends 356 and 358. The lower leaf spring has a uniform width W5 along its entire length, which width W5 is substantially the same, but preferably not larger then the width W3. Upon assembly of leaf springs 330, 332 and 334, spring stack 324 maintains the necessary elasticity and/or other flexural properties, while allowing for movement of end portions of 364 and 368 of the upper leaf spring within the bearing surfaces of the hangers in which they respectively reside.

Assembly 301 shown in FIG. 9 is a slight variation on assembly 300 of FIGS. 8A and 8B where: (i) upper leaf spring 390 has width W7 (preferably 3 inches wide); (ii) the thickness is tapered according to Dayton specifications; and (iii) construction is rolled standard plus 25% thicker to qualify the spring to spec. End spacing 350 between the ends of the upper spring leaf and the middle spring leaf is preferably 3/16 inches for light duty service. A one inch thick main leaf may be substituted for very heavy services in place of the upper and middle leaves of spring stack 324, with all measurements and cuts are in a flat condition before bending.

As shown in FIG. 8A, some preferable dimensions for spring stack are as follows: (i) W13=2.040 inches; (ii) W9=5.250 inches; and (iii) W18=3 inches. This tapering from the 3.0 median width to the 2.040 is preferably accomplished by four cuts. Preferably each cut starts at an end of the upper leaf spring. Preferably each cut is a continuous cut with no scratches or dimples. W18 (the width across the median longitudinal range defined by length range W11) is the original width of the blank and the W11 length range is not cut but rather maintained from the blank used as a raw material. All spring leaves are preferably made from steel and manufactured by machine and spring casting processes.

X. Fifth, Sixth and Seventh Suspension System Embodiments (Retrofit)

Discussion will now shift to a retrofit assembly 600 for forward direction self steering according to the present invention, with reference to FIGS. 16A and 16B. Assembly 600 includes: connection hardware 601; torque rod assembly 602; connection hardware 603; axle 604; axle extension member 605; steel plate 606; bolt 607; axle assembly 608; side view 609; bearing assembly 610; and base member 611.

As shown in FIGS. 16A and 16B, steel plate 606 is furnished by the customer and assembly 600 is located on the top side of the steel plate. Plate 71 has connection hardware 603 welded to the bottom up to one side. Bolt 607 is bolted to one bearing end of torque rod assembly 602 and the opposite bearing end is bolted by bolt 607 to connection hardware 601. Connection hardware 601 is welded to axle assembly 608. Base member 611 is welded to the top center of plate 606. As shown in FIG. 16B, side view 609 shows the top of base member 611. One end of bearing member 610 is mechanically connected to base member 611 through a bearing. The other bearing end of bearing assembly 610 is bolted to the upper portion of axle extension member 605 of axle assembly 608. The lower part of axle extension member 605 is welded to the top center of axle 604 (which is the pre-existing axle in regular use prior at the retrofit). All parts to the rear of 604 are used in the retrofit design and new construction can be purchased for use. This is preferred because there are many styles of air suspensions and this design fits most using components of the present invention designed to provide the self steering feature which is the objective of the retrofit. Any necessary measurements to perform the retrofit are preferably provided to the customer on an instruction sheet. Dimension W17 is 22.5 inches in some preferred embodiments of the present invention.

Discussion will now move to another retrofit assembly 625 for providing self steering according to the present invention with reference to FIGS. 17A and 17B. Assembly 625 includes: connection hardware 626; connection hardware 627; base member 628; connection hardware 629; torque rods 630; bolt 631; plate 632; airbags 633; axle 634; plate 635; hanger 637; member 638; side view 639; bearing assembly 640; and axle extension assembly 641.

As shown in FIG. 17A, top view 637 of assembly 625 shows an extra heavy duty design suitable for use on a 50 ton, 3-axle trailer for hauling heavy equipment with air springs. Assembly 625 is similar to assembly 600 in many respects, but is different in some respects primarily with a view toward building for greater strength and leverage on the axle. One side only is here explained. Base member 628 is customer furnished as connection hardware 626 welded to the bottom. Connection hardware 626 is mechanically connected to a bearing end of torque rod 630*a* by bolt 631. The other bearing end of torque rod 630*a* is mechanically connected to hangar 637 by another bolt 631. Hanger 637 is welded to the bottom of plate 632. Plate 632 is pre-drilled to mount airbag 633*a*. Plate 632 is welded on top of axle 634 and has additional keys welded at contact points for additional strength.

As shown in FIG. 16B, side view 639 of assembly 625 shows the center torque system. Member 638 is welded to the top of base member 628. Connection hardware mounting member 643 extends from base member 628. Connection hardware 627 is mechanically connected to connection hardware mounting member 643. One bearing end of bearing assembly 640 is mechanically connected to connection hardware 627. The other bearing end of bearing assembly 627 is bolted by a bolt 631 to the top end of axle extension assembly 641. Axle extension assembly 641 is welded to the top center of axle 634 so that it extends generally upwards therefrom (for example, at a 90 degree angle). The bottom portion FIG. 17B shows hangar connection hardware 629 (for the left side front of the trailer). Hanger connection hardware 626 (for the right side front of the trailer) can be seen in FIG. 17A. Hanger connection hardware 626,629 is generally similar to hanger connection hardware 603 discussed above in connection with assembly 600 of FIGS. 16A and 16B. Plates 632 and 635 can be best seen in FIG. 17A and they will fit left or right due to the construction and design. Dimension W19 is 22.50 inches in some preferred embodiments of the present invention.

A retrofit assembly 650 for providing self steering in both the forward and reverse directions of vehicle travel will bow be discussed with reference to FIGS. 18A and 18B. Assembly 650 includes: members 651*a*; torque rods 652; connection hardware 653, 655; plates 661, 662, 654, 658, 660; bearing assembly 656; and axle assembly 655. Components 654*a*, 652*a*, 652*c*, 655*a*, 655*c*, 653, 656660*a* and 658*a* provide the forward self steering functionality and are similar to the analogous components of assembly self steering assembly 625 discussed above in connection with FIGS. 17A and 17B.

Two additional torque rods 652*b* and 652*d* can be pressurized (as discussed above in connection with other embodiments) to make the four bar linkage that effects self steering in the reverse direction of travel. Members 651 are shown in place and welded are in place to plates 661 and 662 as best shown in FIG. 18B. One has to make these parts equal in front and behind for limiting support the torque bars and controls are to change the configuration of the system to self steer in forward and reverse when vehicle is shifted to reverse automatically and quickly so vehicle can self steer in either direction.

XI. Aircraft Wheel and Tire Design

FIGS. 19A, 19B and 19C show aircraft wheel assemblies 500 (FIGS. 19A and 19B) and 510 (FIG. 19C) according to the present invention. Assembly 500 includes: tires 504*a,b*; tread surfaces 506*a,b*; inner side wall surfaces 508; outer side wall surfaces 505, 509; opposing hubs 507*a,b*. Assembly 510 includes: tires 514*a,b*; tread surfaces 516*a,b*; and inner side walls 518.

FIGS. 19A and 19B shows a side view of an aircraft wheel assembly having a standard design. This standard design wheel may be used with self steering aircraft struts made according to the present invention. Although FIGS. 19A and 19B only show one wheel having two tires, landing gear struts often include multiple tires and multiple wheels. In conventional applications, tires 504*a,b* each require at least 100 pounds of air pressure to maintain side wall stability on curves and at high speeds. FIG. 19B shows how the standard design tires are mounted on opposing hubs 507*a,b* and is a cross-sectional view as indicated in FIG. 19A (cross-hatching omitted for clarity of illustration.). The tread surface 506*a,b* preferably has a width of 8.5 inches across that makes contact with the ground and has a known carrying capacity for every inch. The distance between the inner side walls 508 of the tires is preferably 3.5 inches. The side walls 505, 509 preferably have a height of 8.5 inches. The present invention can be used with currently standard tires, like those of assembly 500, to improve performance and handling, decrease tire wear and perhaps even allow a decreased tire pressure to be used.

Furthermore, using the self steering features of the present invention, aircraft tire design can be modified to have a shorter side wall height as shown by assembly 510 in FIG. 19C. In assembly 510, side walls 518 and the air pressure can be decreased, relative to the currently standard design, to less than 50 percent and still not roll laterally. This is because self steering orients the tire to be aligned in the direction it is rolling forward so that moments are not created about other axes that would tend to roll the tire laterally onto its side wall. This increases the roll ability with less air pressure and a smoother ride at tread surfaces 516*a,b*. Also, the centrifugal force to drive the wheels will be decreased by using assembly 510, which is considered as an energy saving factor.

XII. Self Steering Aircraft Struts and Control of Same

Figure 20A:
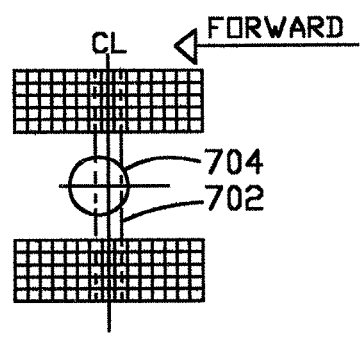
FIG. 20A is a top view of a portion of a first embodiment of an aircraft strut assembly according to the present invention for an aircraft landing gear with single or dual tires and which has self steering for crosswing landing operations.

Referring to FIGS. 20A,B,C, D and E show a landing gear strut assembly 700 that has been modified according to the present invention to better deal with cross winds, especially when landing. Assembly 700 includes: tire axle 702; strut rod assembly 704; internal piston sub-assembly 706; limiting device assembly 708 (original and modified); original tire mounting assembly 710; first point 712; axle shaft 714; second point 716; member 718; slotted pin hole 720; modified member 722; first members 726; second members 728; point 730; third members 732; link 734 and fourth member 735.

When an aircraft touches the ground in a cross wind, the tires skid sideways due to the fact that the tires are kept rigidly in line with the aircraft, which is moving along the runway, while the cross-wind is pushing the aircraft transversely across the runway. This causes the tires to side skid and create large skid marks. This skidding causes wear on the tires and in many cases has caused major accidents. As shown in FIG. 20A, according to an embodiment of the present invention, tire axle 702 is attached to strut rod assembly 704 offset to the rear of the centerline of the strut rod assembly (preferably by approximately 4 inches) instead of at the centerline as in conventional aircraft strut assemblies. As shown in FIG. 20D, internal piston 706 (also called the lower strut rod assembly) extends from the outside casing of a conventional strut rod assembly 704 downwards and rearwards to create the offset (preferably about a 4 inch offset). Internal piston 706 is held in alignment with an original limiting device assembly 708 that can be modified to apply the present invention to a conventional aircraft strut assembly. Note, the view shown in FIG. 20D has one tire removed to show the original strut limiting, the modification of which, to make an embodiment of the present invention, will be discussed below.

Figure 20B:
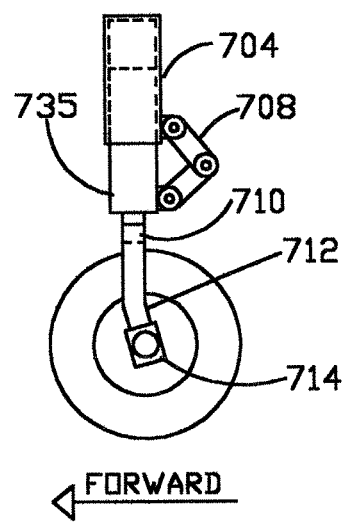
FIG. 20B is an orthographic side view of a portion of the first embodiment strut assembly.
Figure 20D:
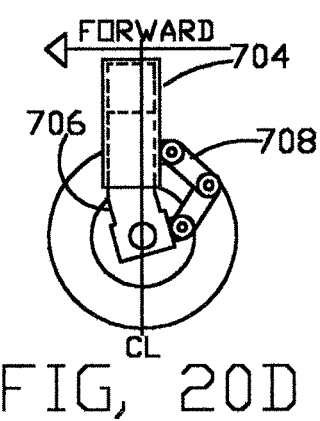
FIG. 20D is an other orthographic side view of a portion of the first embodiment strut assembly.
Figure 20F:
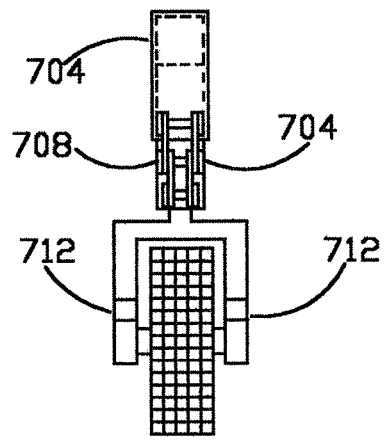
FIG. 20F is an orthographic rear view of a portion of the first embodiment strut assembly.

FIGS. 20B and 20F show a typical single tire strut rod assembly 704 with original limiting device assembly 708 and an original tire mounting assembly 710. At point 712 a modification to the original parts is made by bending the original parts so that the centerline of the axle shaft 714 is 4" to the rear of the centerline of the strut assembly.

The limiting device can be understood by viewing FIGS. 20C and 20E. The modified limiting device allows the wheel at the end of the strut to operate as a caster, meaning that the wheel can move (at least thru some range of motion) with respect to the centerline of the strut assembly. More specifically, the lower strut rod assembly 706 is modified at point 716 with a space to allow a right to left motion and member 718 is modified with a slotted pin hole 720 also to allow the same action. All other parts stay as original.

It is generally preferable to limit the self steering of the tires when aircraft is landing, and to realign the tire axle into a position perpendicular to the aircraft as it settles onto the tires and the pilot is straightening the aircraft down the runway when the cross wind effect is not in play due to the tires now being in line with runway. This is aided by the following modifications. As shown in FIG. 20E, modified member 722 is welded to the upper strut rod assembly 704 and constructed to fit underneath modified limiting device assembly 708. As shown in the lower portion of FIG. 20E, tire axle 702 is long enough to fit between members 726 with the same spacing as at point 716 when the aircraft is airborne to allow the caster action of lower strut rod assembly 706 when the aircraft is airborne in a cross wind. When aircraft first touches the ground, the tires will immediately align themselves with the runway, even though the aircraft is pointed into the wind because the friction of the runway on the tires will cause self steering through assembly 700 according to the present invention. The wind may push the body of the aircraft (not shown) sideways, but the axle will pivot, according to the present invention to remain in the direction in which the aircraft is being steered (that is, straight down the runway).

As the pilot starts to normally straighten the plane, modified member 722 will also assist to center the plane in line with the runway. Point 730 centers between members 732 so that spacing between members 728 is centered in slotted pin hole 720 and landing gear can no longer cast (that is, its tire axle will no longer undergo axle pivoting). The flat surfaces at point 730 and member 734 will maintain the tires steady even when the aircraft strut rods raise and lower in rough conditions.

Referring to FIG. 20G this is a method to have the auto pilot assist the pilot to make a perfectly synchronized crosswind landing by setting a anticipator in the stabilizer controls. As shown in diagram 750 of FIG. 20G, this method is accomplished with reference to relationships between reference points 751, 752, 753, 754, 755, 756, 757 and 758.

To explain the method in non-diagrammatic terms, normally the auto pilot can sense loss of speed and automatically turn the elevators to turn the nose to pick up speed or stall. This system in an accident 4 months ago caused a serious accident when the aircraft hit a wind shear condition. Since the wind shear did not drop the nose the elevators continued to try and drop the nose placing the elevators to the maximum down position. When the nose finally dropped to pick up speed the elevators started to return to flying elevation but were too late and plane pointed straight down before this action happened. If the anticipator had been programmed into this system as soon as the elevators hit their limit, then the auto pilot would sense a control failure and quickly bring back the elevators to a slight downward position. As soon as the wind shear ended, aircraft nose would be in a slight downward position to pick up speed as speed is what is needed when the wind shear ends. After this the aircraft would be controlled rest to normal.

As shown in FIGS. 20H and 20I, the type of anticipator circuits discussed above in connection with FIG. 20G can be included in assembly 800, which assembly further includes a self steering strut assembly as discussed above in connection with the embodiment of FIGS. 20A to 20F. Anticipator and strut assembly 800 includes: self steering control cylinders 802, 804; recess 806; locked engagement 808; switch 810; switch 812; electrical lines 814, 816, 824, 826, 832, 838, 840, 846; ground switch 818; strut outer housing 820; cylinder mounting member 822; tires 828, 830; cylinder 834; switch 836; control valve 844; and control valve 848.

As shown in FIGS. 20H and 20I, in assembly 800, with its self steering axles to facilitate cross wind landing, the anticipator circuit would be turned on when the gear touches the ground switch 818. This will send a signal to the auto pilot that the plane should assist the controls to lock the landing gear in approximately 3 seconds. The anticipator circuit, sensing the contact, will align the aircraft from its angle position to straight on the runway and control components 804 and 802 to lock the landing gear pointing in the runway direction. The 3 seconds (or other appropriate time interval) should match the time interval that it takes the landing gear struts to go from no weight load to full aircraft weight. This system would eliminate aircraft shudder, which would: (i) decrease chafing of wiring harnesses; (ii) decrease loosening of rivets; and (ii) could prevent flight and landing accidents.

At any time to allow easy ground motion with no tire drag on corners, the pilot can manually turn on switch 810 which will turn on the 4-way control valve 848 that switches line 832 to line 826 and line 846 to line 824. This pressurizes cylinder 802 to expand and thereby enter self steering mode, returns line 826 to line 832 and returns line 826 to the 4-way valve 844 now onto line 840. When the self steering feature is activated: (i) one axle in each set can self steer to allow easier turning; and (ii) one axle in each set will help maintain the aircraft on a correct path in a high cross wind. Tires 828 and 830 should be in parallel with any axles ahead of any landing gear sets ahead of the rear axles of any set. This saves energy, decreases landing gear strain and decreases tire wear. Engine power needed to make a 90 degree turn will be less than 25 percent of what it currently is. When the aircraft is parked, the pilot turns off switch 810 to deactivate the self steering. This will depressurize cylinder 802 so that it contracts and enters a locked position with the tire axles perpendicular to the center line of the aircraft frame and the tires parallel to the aircraft frame. In this locked position, the aircraft can be towed in reverse and/or moved by ground powered equipment in the conventional manner without self steering.

XII. Eighth Suspension System Embodiment (Retrofit)

Another retrofit suspension assembly 900 for heavy duty tractors, according to the present invention, will now be presented. Assembly 900 includes: hangers 902, 906; spaces 908; item 916; end 918; and spacer 924.

As shown in FIGS. 21A,B,C,D, and as those of skill in the art will appreciate, assembly 900 provides for self steering for tractors with two or more driving axles.

FIG. 21A shows the average heavy duty spring suspension where the spring ends are over the axles. The wide spacing between hanger 906 and spring ends it receives requires closing the gap. FIG. 21A shows a rear end view looking forward. As shown in FIG. 21B, hanger 906 has plates 926 applied to achieve the proper spacing. The axle should be centered first. Then opposite axles, such as right front and left rear should be jacked to the limit at the same time. Then the thickness plates are applied as needed to ensure proper engagement between the spring ends and the hangers. The thickness plates are welded to the hangers. As shown in FIG. 21A, hanger 902 has spaces 908. In a retrofit and/or repair operation, all front and rear, top and bottom should be replaced with a newly designed torque bar with a new bolting end 918 (see FIG. 21C) and spacer 924 on all ends of item 916 (see FIGS. 21A and 21C).

DEFINITIONS

Any and all published documents mentioned herein shall be considered to be incorporated by reference, in their respective entireties, herein to the fullest extent of the patent law. The following definitions are provided for claim construction purposes:

Present invention: means at least some embodiments of the present invention; references to various feature(s) of the "present invention" throughout this document do not mean that all claimed embodiments or methods include the referenced feature(s).

Embodiment: a machine, manufacture, system, method, process and/or composition that may (not must) meet the embodiment of a present, past or future patent claim based on this patent document; for example, an "embodiment" might not be covered by any claims filed with this patent document, but described as an "embodiment" to show the scope of the invention and indicate that it might (or might not) covered in a later arising claim (for example, an amended claim, a continuation application claim, a divisional application claim, a reissue application claim, a re-examination proceeding claim, an interference count); also, an embodiment that is indeed covered by claims filed with this patent document might cease to be covered by claim amendments made during prosecution.

First, second, third, etc. ("ordinals"): Unless otherwise noted, ordinals only serve to distinguish or identify (e.g., various members of a group); the mere use of ordinals shall not be taken to necessarily imply order (for example, time order, space order).

Module/Sub-Module: any set of hardware, firmware and/or software that operatively works to do some kind of function, without regard to whether the module is: (i) in a single local proximity; (ii) distributed over a wide area; (ii) in a single proximity within a larger piece of software code; (iii) located within a single piece of software code; (iv) located in a single storage device, memory or medium; (v) mechanically connected; (vi) electrically connected; and/or (vii) connected in data communication.

Electrically Connected: means either directly electrically connected, or indirectly electrically connected, such that intervening elements are present; in an indirect electrical connection, the intervening elements may include inductors and/or transformers.

Mechanically connected: Includes both direct mechanical connections, and indirect mechanical connections made through intermediate components; includes rigid mechanical connections as well as mechanical connection that allows for relative motion between the mechanically connected components; includes, but is not limited to, welded connections, solder connections, connections by fasteners (for example, nails, bolts, screws, nuts, hook-and-loop fasteners, knots, rivets, quick-release connections, latches and/or magnetic connections), force fit connections, friction fit connections, connections secured by engagement caused by gravitational forces, pivoting or rotatable connections, and/or slidable mechanical connections.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

To the extent that the definitions provided above are consistent with ordinary, plain, and accustomed meanings (as generally shown by documents such as dictionaries and/or technical lexicons), the above definitions shall be considered supplemental in nature. To the extent that the definitions provided above are inconsistent with ordinary, plain, and accustomed meanings (as generally shown by documents such as dictionaries and/or technical lexicons), the above definitions shall control.

Unless otherwise explicitly provided in the claim language, steps in method steps or process claims need only be performed in the same time order as the order the steps are recited in the claim only to the extent that impossibility or extreme feasibility problems dictate that the recited step order be used. This broad interpretation with respect to step order is to be used regardless of whether the alternative time ordering(s) of the claimed steps is particularly mentioned or discussed in this document—in other words, any step order discussed in the above specification shall be considered as required by a method claim only if the step order is explicitly set forth in the words of the method claim itself. Also, if some time ordering is explicitly set forth in a method claim, the time ordering claim language shall not be taken as an implicit limitation on whether claimed steps are immediately consecutive in time, or as an implicit limitation against intervening steps.

What is claimed is:

1. A steering system for a vehicle, the vehicle defining a vertical direction, a forward direction and a reverse direction, the steering system comprising:
   an axle assembly defining a central axis;
   a wheel assembly;

an axle-to-wheel connection hardware set defining a caster axis with the caster angle being the angle between the caster axis and the vertical direction, comprising:
- a rod in rotatable communication with the axle assembly, and comprising at least one threaded portion;
- a frame member comprising a threaded portion engaged with the threaded portion of the rod, such that any rotation of the rod will draw the frame member along the threaded portion, wherein the frame member is operatively connected with the wheel assembly so that the wheel assembly can rotate about the caster axis with respect to the axle assembly as the frame member is drawn along the threaded portion of the rod;

a caster angle adjustment assembly; and the caster angle adjustment assembly is structured, connected and located to actuate at least the axle-to-wheel connection hardware set to change the caster angle between at least a first angle and a second angle during operation of the vehicle, wherein said first angle is a positive angle when said vehicle is in a forward gear and said second angle is a negative angle when said vehicle is in a reverse gear.

* * * * *